(12) United States Patent
Kawano et al.

(10) Patent No.: US 10,841,446 B2
(45) Date of Patent: Nov. 17, 2020

(54) COPYING APPARATUS, AND METHOD OF PRODUCING PRINTOUT

(71) Applicant: SEIKO EPSON CORPORATION, Tokyo (JP)

(72) Inventors: Yo Kawano, Nagano (JP); Yoichiro Maki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/710,031

(22) Filed: Dec. 11, 2019

(65) Prior Publication Data
US 2020/0195797 A1 Jun. 18, 2020

(30) Foreign Application Priority Data
Dec. 13, 2018 (JP) ................................ 2018-233201

(51) Int. Cl.
*H04N 1/00* (2006.01)
*H04N 1/393* (2006.01)

(52) U.S. Cl.
CPC ..... *H04N 1/00708* (2013.01); *H04N 1/00769* (2013.01); *H04N 1/00774* (2013.01); *H04N 1/00779* (2013.01); *H04N 1/393* (2013.01); *H04N 2201/0082* (2013.01)

(58) Field of Classification Search
CPC .................................................... H04N 1/393
See application file for complete search history.

(56) References Cited

U.S. PATENT DOCUMENTS

| | | | | |
|---|---|---|---|---|
| 4,647,189 A | * | 3/1987 | Fujiwara | G03G 15/041 355/55 |
| 4,682,877 A | * | 7/1987 | Fujiwara | G03G 15/5095 355/55 |
| 4,920,377 A | * | 4/1990 | Ito | G03G 15/36 355/55 |
| 5,008,709 A | * | 4/1991 | Shinada | G03G 15/50 399/376 |
| 5,150,224 A | * | 9/1992 | Mizude | G03G 15/5095 358/449 |
| 5,568,573 A | * | 10/1996 | Wada | H04N 1/00681 355/23 |
| 5,671,463 A | * | 9/1997 | Morikawa | G03G 15/5095 399/197 |

(Continued)

FOREIGN PATENT DOCUMENTS

| | | | |
|---|---|---|---|
| EP | 1696658 A1 * | 8/2006 | ......... H04N 1/00968 |
| JP | 04-033898 A | 2/1992 | |

(Continued)

*Primary Examiner* — Ted W Barnes
(74) *Attorney, Agent, or Firm* — Global IP Counselors, LLP

(57) ABSTRACT

At the time of copying a smaller document and a larger document on output sheets having the same size, in a first case where a first document is smaller and a second document is larger, a printing control unit analyzes a content of the second document, and copies the first document and the second document on output sheets having sizes corresponding to the analysis result. In a second case where the first document is larger and the second document is smaller, a content of the first document is analyzed, and the first document and the second document are copied on output sheets having sizes corresponding to the analysis result.

11 Claims, 10 Drawing Sheets

(56) References Cited

U.S. PATENT DOCUMENTS

| | | | |
|---|---|---|---|
| 5,907,744 A | 5/1999 | Yamashita et al. | |
| 2002/0085186 A1* | 7/2002 | Sawada | G06F 3/1234 355/40 |
| 2006/0115298 A1* | 6/2006 | Fukata | G03G 15/36 399/194 |
| 2007/0025752 A1* | 2/2007 | Maeda | G03G 15/5095 399/81 |
| 2015/0286906 A1* | 10/2015 | Murakami | H04N 1/393 358/1.2 |
| 2016/0070219 A1* | 3/2016 | Ono | G03G 15/607 399/86 |
| 2018/0167525 A1* | 6/2018 | Ogasawara | H04N 1/04 |
| 2018/0183976 A1* | 6/2018 | Sei | H04N 1/00811 |
| 2019/0364170 A1* | 11/2019 | Galanida | H04N 1/3873 |
| 2020/0137248 A1* | 4/2020 | Watanabe | H04N 1/2032 |

FOREIGN PATENT DOCUMENTS

| | | | |
|---|---|---|---|
| JP | 10-250192 A | | 9/1998 |
| JP | 2019128633 A | * | 8/2019 |

* cited by examiner

FIG. 2

| 1ST DOCUMENT | 2ND DOCUMENT | SECOND SIZE DOCUMENT TRIMMING DETERMINATION | SECOND SIZE DOCUMENT REDUCTION DETERMINATION | OUTPUT SHEET SIZE | PRINTING MODE ON OUTPUT SHEET OF 1ST DOCUMENT | PRINTING MODE ON OUTPUT SHEET OF 2ND DOCUMENT | |
|---|---|---|---|---|---|---|---|
| FIRST SIZE | FIRST SIZE | — | — | FIRST SIZE | SAME SIZE COPY | SAME SIZE COPY | ··· (a) |
| FIRST SIZE | SECOND SIZE | TRIMMABLE | — | FIRST SIZE | SAME SIZE COPY | SAME SIZE COPY WITH TRIMMED | ··· (b) |
| FIRST SIZE | SECOND SIZE | UNTRIMMABLE | REDUCIBLE | FIRST SIZE | SAME SIZE COPY | REDUCED COPY | ··· (c) |
| FIRST SIZE | SECOND SIZE | UNTRIMMABLE | IRREDUCIBLE | SECOND SIZE | SAME SIZE COPY BY ADDING MARGIN | SAME SIZE COPY | ··· (d) |
| SECOND SIZE | FIRST SIZE | TRIMMABLE | — | FIRST SIZE | SAME SIZE COPY WITH TRIMMED | SAME SIZE COPY | ··· (e) |
| SECOND SIZE | FIRST SIZE | UNTRIMMABLE | REDUCIBLE | FIRST SIZE | REDUCED COPY | SAME SIZE COPY | ··· (f) |
| SECOND SIZE | FIRST SIZE | UNTRIMMABLE | IRREDUCIBLE | SECOND SIZE | SAME SIZE COPY | SAME SIZE COPY BY ADDING MARGIN | ··· (g) |
| SECOND SIZE | SECOND SIZE | BOTH TRIMMABLE | BOTH REDUCIBLE | FIRST SIZE | SAME SIZE COPY WITH TRIMMED | SAME SIZE COPY WITH TRIMMED | ··· (h) |
| SECOND SIZE | SECOND SIZE | AT LEAST ONE UNTRIMMABLE | AT LEAST ONE UNREDUCIBLE | FIRST SIZE | REDUCED COPY | REDUCED COPY | ··· (i) |
| SECOND SIZE | SECOND SIZE | AT LEAST ONE UNTRIMMABLE | AT LEAST ONE UNREDUCIBLE | SECOND SIZE | SAME SIZE COPY | SAME SIZE COPY | ··· (j) |

FIRST CASE: rows (a)–(d)
SECOND CASE: rows (e)–(j)

FIG. 3

A4 DOCUMENT (G1)
AAAAAAA
AAAAA
AAAAAAAA
AAAAAAAAA
AAAAAAAAAA
AAAAAA

A3 DOCUMENT (G2) — TRIMMABLE
(G202, G201)
AAAAAAA
AAAAA
AAAAAAAA
AAAAAAAAAAAA

A3 DOCUMENT (G3) — UNTRIMMABLE AND REDUCIBLE
CCCCC DDDDDD EEEEE FFFFFFF GGGG

A3 DOCUMENT (G4) — UNTRIMMABLE AND IRREDUCIBLE
AAAAAAA AAAAAAAAA
AAAAA AAAAAAAAA
AAAAAAAA AAAAAAAA
AAAAAAAAA AAAAAAAAA
AAAAAAAAAA AAAAAAAAA
AAAAAAAA AAAAAA

ONE SURFACE OF A4 OUTPUT SHEET / THE OTHER SURFACE OF A4 OUTPUT SHEET (b), (e)
AAAAAAA | AAAAAAA
AAAAA | AAAAA
AAAAAAAA | AAAAAAAA
AAAAAAAAA | AAAAAAAAA
AAAAAAAAAA | AAAAAAAAAA
AAAAAA | AAAAAA

ONE SURFACE OF A4 OUTPUT SHEET / THE OTHER SURFACE OF A4 OUTPUT SHEET (c), (f)
AAAAAAA | CCCCC
AAAAA | DDDDDD
AAAAAAAA | EEEEEE
AAAAAAAAA | FFFFFFFF
AAAAAAAAAA | GGGG
AAAAAA |

ONE SURFACE OF A3 OUTPUT SHEET / THE OTHER SURFACE OF A3 OUTPUT SHEET (d), (g) — MARGIN
AAAAAAA
AAAAA
AAAAAAAA
AAAAAAAAA
AAAAAAAAAA
AAAAAA

AAAAAAA AAAAAAAAA
AAAAA AAAAAAAAA
AAAAAAAA AAAAAAAA
AAAAAAAAA AAAAAAAAA
AAAAAAAAAA AAAAAAAAA
AAAAAAAA AAAAAA

COPYING APPARATUS, AND METHOD OF PRODUCING PRINTOUT

The present application is based on, and claims priority from JP Application Serial Number 2018-233201, filed Dec. 13, 2018, the disclosure of which is hereby incorporated by reference herein in its entirety.

BACKGROUND

1. Technical Field

The present disclosure relates to a copying apparatus, and a method of producing a printout.

2. Related Art

JP-A-10-250192 describes that a user cancels a double-sided copy mode without performing double-sided copy when documents having different sizes are mixedly loaded even though the double-sided copy mode is selected.

At the time of copying a plurality of documents, there is a need for copying the documents on output sheets having the same size even though documents having various sizes are mixedly loaded.

SUMMARY

An object of the present disclosure is to copy documents having various sizes on output sheets having the same size.

According to an aspect of the present disclosure, a copying apparatus for achieving the object includes a document reading unit that reads a document, and a printing control unit that prints a content of the read document on an output sheet. At the time of copying a document having a first size and a document having a second size larger than the first size on output sheets having the same size, in a first case where a first document has the first size and a second document has the second size, the printing control unit analyzes a content of the second document, and copies the first and second documents on output sheets having sizes corresponding to the analysis result, and in a second case where the first document has the second size and the second document has the first size, the printing control unit analyzes a content of the first document, and copies the first and second documents on output sheets having sizes corresponding to the analysis result.

In the case of the present configuration, at the time of copying two documents having different sizes, sizes of the output sheets are decided according to the analysis result of the image of the document having the second size which is a larger size regardless of a reading order of the documents. That is, the sizes of the output sheets are decided according to the analysis result of the image of the document having the second size even though the document having the second size is read before or after the document having the first size. It is possible to copy two documents having different sizes from each other on the output sheets having the same size by copying the first document and the second document on the output sheets having the decided sizes. The first document and the second document may be copied on the output sheets having the same size. A configuration in which the first document is copied on one surface of one output sheet and the second document is copied on the other surface or a configuration in which the first document is copied on one surface of one output sheet and the second document is copied on one surface of another one output sheet may be assumed.

In the copying apparatus for achieving the object, when a position of a pattern included in the document having the second size is analyzed and the pattern falls in the first size, the printing control unit may copy the document having the second size on an output sheet having the first size such that the pattern of the document having the second size falls in the first size by cutting off at least a part of a portion other than the pattern, and may copy the document having the first size on the output sheet having the first size at an equal magnification.

That is, when the margin which is the portion other than the pattern is removed on the image of the document having the second size and the pattern falls in the first size (the pattern is not missed), the document is trimmed to the first size without missing the portion of the pattern. The pattern cut through the trimming is copied on the output sheet having the first size. Therefore, according to the present configuration, it is possible to copy the document without missing the pattern included in the document having the second size. Since the document having the second size and the document having the first size are copied on the output sheets having the first size which is the smaller size, it is possible to suppress the costs for the output sheets compared to a case where both the documents are copied on the output sheets larger than the first size.

In the copying apparatus for achieving the object, when the pattern does not fall in the first size, the printing control unit may copy the document having the second size on an output sheet having the second size at the equal magnification, and may copy a content of the document having the second size generated by adding a margin to a content of the document having the first size on the output sheet having the second size at the equal magnification.

That is, when the pattern of the image of the document having the second size does not fall in the first size, both the documents are copied on the output sheets having the second size. Since the document having the second size is copied on the output sheet having the second size at the equal magnification, it is possible to copy the document without missing the pattern included in the document having the second size. Since the document having the first size is copied at the equal magnification by adding the margin so as to have the second size without being enlarged to the second size, the consumption of the recording agents does not increase compared to a case where the document is copied on the output sheet having the first size. Thus, it is possible to suppress the costs for the recording agents.

In the copying apparatus for achieving the object, on an assumption that the document having the second size is copied on an output sheet having the first size at a reduced magnification, the printing control unit may analyze whether or not a mark included in the document having the second size is identifiable by a user on the output sheet having the first size. When the mark is identifiable by the user, the printing control unit may copy the document having the second size on the output sheet having the first size at the reduced magnification, and may copy the document having the first size on the output sheet having the first size at the equal magnification.

That is, when the document having the second size is reduced to the first size and the mark included in the document having the second size is identifiable by the user, the document having the second size is copied on the output sheet having the first size at the reduced magnification.

Accordingly, it is possible to identify the mark included in the document having the second size even on the output sheet having the first size on which the document is copied at the reduced magnification. Since the document having the second size and the document having the first size are copied on the output sheets having the first size, it is possible to suppress the costs for the output sheets compared to a case where both the documents are copied on the output sheets larger than the first size.

In the copying apparatus for achieving the object, when the mark is not identifiable by the user, the printing control unit may copy the document having the second size on an output sheet having the second size at the equal magnification, and may copy a content of the document having the second size generated by adding a margin to a content of the document having the first size on the output sheet having the second size at the equal magnification.

That is, when the document having the second size is reduced to the first size and the mark included in the document having the second size is not identifiable by the user, the document having the second size is copied on the output sheet having the second size at the equal magnification (is not copied on the output sheet having the first size at the reduced magnification). Thus, the mark included in the document having the second size has the same size as the document even the output sheet having the second size. Since the document having the first size is copied at the equal magnification by adding the margin so as to have the second size without being enlarged to the second size, the consumption of the recording agents does not increase compared to a case where the document is copied on the output sheet having the first size. Thus, it is possible to suppress the costs for the recording agents.

In the copying apparatus for achieving the object, the printing control unit may determine whether or not the mark is identifiable by the user by using a learned model produced by machine learning based on training data including a combination of a content indicating the document read by the document reading unit and a size of an output sheet on which the document is actually copied.

When the image of the document is printed on the output sheet having the aforementioned size, the training data including the combination of the image of the document and the size of the output sheet can be used as the training data indicating that the mark is identifiable by the user. Accordingly, it is possible to determine whether or not the mark is identifiable by the user on the output sheet having the first size when the document having the second size including the mark is copied on the output sheet having the first size at the reduced magnification by using the learned model produced as the result of the machine learning based on such training data. It is possible to determine the relationship between documents having various sizes including a mark having any form and sizes of output sheets according to an actual trend of the user by performing the determination using the learned model.

In the copying apparatus for achieving the object, the printing control unit may obtain a size of the mark by OCR, and may determine whether or not the mark is identifiable by the user when the document having the second size is copied on the output sheet having the first size at the reduced magnification by comparing the size of the mark with a threshold.

Accordingly, in the case of the present configuration, it is possible to obtain the determination result of whether or not the reduced mark is identifiable by the user depending on the size of the mark.

In the copying apparatus for achieving the object, a time taken from when reading of the first document is started to when copying of two documents is ended in the first case may be longer than in the second case.

When the document having the second size is read later (first case), the size of the output sheet is not able to be decided until the analysis of the image of the document having the second size read later is ended. When the document having the second size is read first (second case), the analysis of the image of the document having the second size read first is ended, and the processor specifies that the document read later has the size smaller than the document read first. Accordingly, it is possible to decide the size of the output sheet without waiting for the ending of the analysis of the document read later. Accordingly, the time taken from when the reading of the first document is started to when the feeding of the output sheet is started in the first case is longer than in the second case. As a result, the time taken from when the reading of the first document is started to when the copying of two documents is ended in the first case is longer than in the second case. According to the present configuration, the user can quickly obtain the printout in the second case compared to a case where the size of the output sheet is decided after the analysis of the document read later is ended as in the first case. Accordingly, it is possible to improve the convenience of the user.

The copying apparatus for achieving the object may further include a plurality of sheet feed trays. The printing control unit selects a size of the output sheet from sizes of sheets corresponding to the sheet feed trays.

According to the present configuration, it is possible to decide the size of the output sheet from the sizes of the sheets corresponding to the sheet feed trays. It is assumed that the sheet feed tray in which the sheets having the first size are accommodated or the sheet feed tray in which the sheets having the second size are accommodated are not included in the copying apparatus.

In the copying apparatus for achieving the object, when the output sheet having the size corresponding to the analysis result is not feedable, the printing control unit may allow a user to select any one of printing after the output sheet having the size corresponding to the analysis result is fed and printing on an output sheet having a size selected according to the analysis result from sizes of feedable output sheets, and may perform the printing according to the selection of the user.

According to the present configuration, it is possible to copy the document on the output sheet having the size corresponding to the method selected by the user. Accordingly, it is possible to reduce a possibility that the document is copied on the output sheet having the size which is not intended by the user.

According to another aspect of the present disclosure, a method of producing a printout for achieving the object includes, at the time of copying a document having a first size and a document having a second size larger than the first size on output sheets having the same size, in a first case where a first document has the first size and a second document has the second size, analyzing a content of the second document, and copying the first and second documents on output sheets having sizes corresponding to the analysis result, and in a second case where the first document has the second size and the second document has the first size, analyzing a content of the first document, and copying the first and second documents on output sheets having sizes corresponding to the analysis result.

According to this method, even though the document having the second size is read before or after the document having the first size, the first document and the second document are copied on the output sheets having the sizes corresponding to the analysis result of the image of the document having the second size. As a result, the user can obtain the printout on which two documents having different sizes from each other are copied on the output sheets having the same size.

BRIEF DESCRIPTION OF THE DRAWINGS

FIG. 2 is a diagram for describing a decision logic of an output sheet size and a mode for printing on an output sheet having a decided size.

FIG. 3 is a schematic diagram illustrating a mode for printing on an output sheet.

DESCRIPTION OF EXEMPLARY EMBODIMENTS

Hereinafter, embodiments of the present disclosure will be described according to the following order.
1. Configuration of copying apparatus:
2. Configuration of learning server:
3. Printing control process:
3-1. Output sheet size provisional decision process:
4. Other embodiments:

1. Configuration of Copying Apparatus

Figure 1:
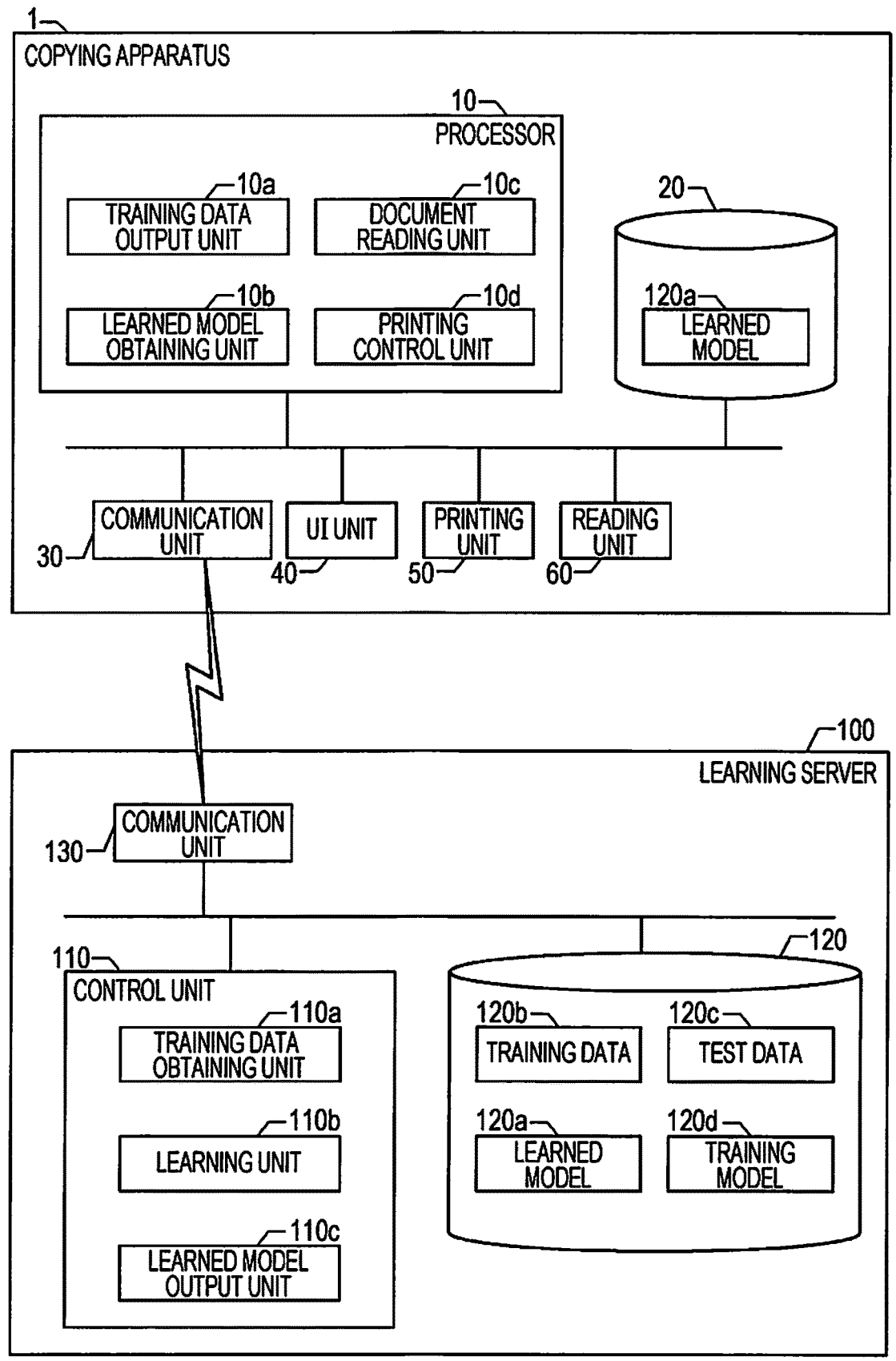
FIG. 1 is a block diagram of a copying apparatus and a learning server.

FIG. 1 is a block diagram illustrating a configuration of a copying apparatus 1 and a learning server 100 according to an embodiment of the present disclosure. The copying apparatus 1 includes a processor 10, a nonvolatile memory 20, a communication unit 30, a user interface (UI) unit 40, a printing unit 50, and a reading unit 60. The processor 10 includes a CPU, a ROM, and a RAM (all not illustrated), and can control the units of the copying apparatus 1 by executing various programs recorded in the nonvolatile memory 20. The processor 10 may be constituted by a single chip, or may be constituted by a plurality of chips. For example, an ASIC may be adopted instead of the CPU, or the CPU and the ASIC may cooperate with each other.

The communication unit 30 includes various removable memories attached to the copying apparatus 1 and a communication interface circuit for communicating with other apparatuses connected to the copying apparatus 1 in a wired or wireless manner according to various communication protocols. The processor 10 can communicate with the learning server 100, to be described below, which is connected via the communication unit 30.

The UI unit 40 includes a touch panel type display, and various keys and switches. The processor 10 can obtain manipulation contents of a user via the UI unit 40. The processor 10 can display various information on the display of the UI unit 40, and can notify the user of the displayed information.

The printing unit 50 includes an actuator, a sensor, a drive circuit, and a mechanical component for performing printing on various printing media by a known printing method such as an ink jet method or an electrophotographic method. The printing unit 50 includes a plurality of sheet feed trays, and can accumulate output sheets having sizes corresponding to the plurality of sheet feed trays. The sheet feed trays may retain the output sheets before printing, or may be in various forms such as a cassette or a manual feed tray. In the present embodiment, an example in which the printing unit 50 includes two cassettes will be described. The printing unit 50 includes a transport mechanism which feeds output sheets accumulated in each sheet feed tray (cassette) one by one, is transports the output sheets within a transport path, and discharges the printed output sheets in course of transporting.

The reading unit 60 includes devices for reading documents placed on a document stage glass or documents set in an ADF document tray, for example, a known color image sensor and a light source, an actuator, a drive circuit, or a sensor for transporting the documents, and a mechanical component. An ADF document sensor that detects whether or not there are documents set in the ADF document tray and the maximum size of the documents set in the ADF document tray is included in the sensor included in the reading unit 60. The reading unit 60 includes a transport mechanism which feeds the documents set in the ADF document tray one by one, transports the documents within a transport path, and discharges the scanned documents by irradiating the documents with light from the light source.

The reading unit 60 includes a document guide for guiding a position in a direction perpendicular to a transporting direction of the documents set in the ADF document tray. For example, when A3 documents and A4 documents are set in the ADF document tray in a mixed state, the documents are positioned by the document guide such that a short side of the A3 document and a long side of the A4 document are aligned. The A3 document is read in course of being transported such that the long side is parallel to the transporting direction, and the A4 document is read in course of being transported such that the short side is parallel to the transporting direction. For example, when B4 documents and B5 documents are mixedly loaded, the documents are positioned by the document guide such that a short side of the B4 document and a long side of the B5 document are aligned. The B4 document is read in course of being transported such that the long side is parallel to the transporting direction, and the B5 document is read in course of being transported such that the short side is parallel to the transporting direction.

The processor 10 has a copying function of scanning the document set in the ADF document tray of the reading unit 60 by controlling the reading unit 60 and printing a scanned image on the output sheet by controlling the printing unit 50. A program (not illustrated) executed by the processor 10 and a learned model 120a are recorded in the nonvolatile memory 20.

The processor 10 controls the units of the copying apparatus 1 by various programs recorded in the nonvolatile memory 20. A copy control program is included in these programs. The processor 10 functions as a document reading unit 10c and a printing control unit 10d by executing the copy control program.

In the copying apparatus 1 of the present embodiment, a setting of a "single side/double side" setting and a "size-mixed document loading" setting are included in settings related to the copying function. The "single side/double side" setting is a reading surface of the document or a setting related to a printing surface of the output sheet, and includes, for example, options such as "single side->single side" and "single side->double side". The "single side->single side" means that one surface of the document is copied to one surface of the output sheet, and the "single side->double side" means that two single-sided documents are copied to both surfaces of one output sheet. In the "size-mixed document loading" setting, any of "on" and "off" is set. When the "size-mixed document loading" setting is set as "on", the copying of documents having different sizes is permitted, and when the "size-mixed document loading" setting is set as "off", the copying of the documents having the different sizes is not permitted.

In the copying apparatus 1, when the "single side/double side" setting is set as "single side->double side" and the "size-mixed document loading" setting is set as "on", two single-sided documents having different sizes can be copied to both surfaces of one output sheet. For example, a combination of the A3 document and the A4 document and a combination of the B4 document and the B5 document may be assumed as combinations of the sizes of the mixedly loaded documents. Accordingly, for example, a double-sided copy set such that the A3 document and the A4 document are allocated and printed on both surfaces of an A3 output sheet one by one a double-sided copy set such that the A3 document and the A4 document are allocated and printed on both surfaces of an A4 output sheet one by one may be assumed.

When a copy start command is input while the documents are set in the ADF document tray, the copy control program is executed. Due to the function of the document reading unit 10c, the processor 10 reads the documents set in the ADF document tray while transporting the documents one by one by controlling the reading unit 60, and records the read image in the recording medium. The maximum size of the documents (including documents having various sizes) set in the ADF document tray can be obtained by the ADF document sensor, but the processor 10 obtains the sizes of the documents one by one at the time of reading the documents.

Due to the function of the printing control unit 10d, the processor 10 analyzes the read image of the document, decides the size of the output sheet based on the analysis result, and prints the read image on the output sheet having the decided size. More specifically, the processor 10 decides the size of the output sheet based on the analysis result obtained by analyzing the document images for two documents to be copied on both surfaces of the output sheet, prints the first document on one surface of the decided output sheet, and prints the second document on the other surface.

Since there is a higher possibility of reducing the cost of the output sheets as the size of the output sheet becomes smaller, it is desirable that the document can be copied on the output sheet smaller than the document. However, when the document is copied on the output sheet smaller than the document with no change, an edge of a pattern included in the document may be missed on the output sheet. When the image of the document is printed on the output sheet at a reduced magnification in order to copy the document on the output sheet smaller than the document, a mark included in the document may be printed on the output sheet with a small size, and thus, there is a possibility that the user is not able to identify the mark on the output sheet. Even though the document is copied on the output sheet smaller than the document, when the user is not able to identify the mark, there is a possibility that the document is printed again. In this case, costs for recording agents and output sheets are increased.

In the present specification, the pattern may be assumed as a portion of the printing surface of the printing medium at which the recording agent is recorded, for example, a portion at which a background other than a design, a photo, a letter, a line, or a blank sheet is recorded. The mark may be assumed as a perceptual object indicating a predetermined object, for example, a letter or a line (a ruled line, a border line, or a contour line). Accordingly, the pattern includes the mark.

Thus, the size of the output sheet is decided based on the next three policies related to the contents of the image indicating the document. The first policy is to permit the printing on the output size smaller than the document when the document can be copied without missing the pattern of the document at the time of copying the document on the output sheet smaller than the document. The second policy is to permit the printing on the output sheet smaller than the document (permit reduced copy) in a state (size or thickness) in which the reduced mark is easily identified by the user on the assumption that the document is copied on the output sheet smaller than the document at the reduced magnification. The third policy is to print the document on the output sheet having the same size as the document when at least any one of a state in which the pattern of the document is missed and a state in which the mark is hardly identified by the user is expected at the time of copying the document on the output sheet smaller than the document. The reason of the third policy is because it is possible to avoid the missing of the pattern or the difficulty in identifying the mark when the output sheet is not smaller than the document (that is, the size of the output sheet is equal to or greater than the size of the document), but it is desirable that not the output sheet larger than the document but the output sheet having the same size as the document is selected in order to suppress the costs for the recording agents and the output sheets.

Hereinafter, a decision logic of the output sheet size when documents having both a first size and a second size (>first size) are copied on both surfaces of one output sheet and there are the first size and the second size as the options of the size of the output sheet will be described. FIG. 2 is a diagram for describing the decision logic of the output sheet size and modes for printing the output sheet having the decided size according to the present embodiment.

As illustrated in FIG. 2, four patterns are present as combinations of two documents to be printed on both surfaces of one output sheet. That is, there four patterns of a case where both the first document and the second document have the first size, a case where the first document has the first size and the second document has the second size (corresponding to a first case), a case where the first document has the second size and the second document has the first size (corresponding to a second case), and a case where both the first document and the second document have the second size. In the present specification, of two documents to be copied on both surfaces of any one output sheet, the document read first is referred to as the first document, and the document read later is referred to as the second document (are not limited to the first document and the second document of all the documents set in the ADF document tray).

In order to suppress the costs for the recording agents and the output sheets, not the output sheet having not the second size greater than the size of the document but the same first size is selected for the document having the first size. Accordingly, when both the first document and the second document have the first size (see (a) of FIG. 2), the processor 10 decides the first size as the size of the output sheet. The processor 10 copies the documents of the first size on each surface of the output sheet having the first size at an equal magnification.

As illustrated in FIG. 2, there is a difference between the first case and the second case in that the document having the second size is read before or after the document having the first size. It is not necessary to examine whether to copy the document having the first size on the output sheet having the second size or on the output sheet having the first size based on the image of the document having the first size, and the size of the output sheet is decided depending on the analysis result of the image of the document having the second size.

A trimming determination of the second-size document which is illustrated in FIG. 2 is performed by determining whether or not the pattern falls in the first size as the analysis result of the position of the pattern included in the document having the second size. FIG. 3 is a diagram for describing documents (G1 to G4) having two kinds of sizes and modes of printing the double-sided copy corresponding to the combination thereof. Alphabets written in balloons of FIG. 3 correspond to alphabets written on a right side of FIG. 2.

G2 illustrated in FIG. 3 represents image data indicating the A3 document. A region G201 surrounded by a broken line within G2 indicates a minimum rectangular region including the pattern. The processor 10 can obtain the region G201 which is the minimum rectangular region including the pattern by obtaining the position of the pattern included in the document having the second size through image analysis. A region G202 surrounded by a dashed dotted line within G2 is a region corresponding to the A4 size. In this example, A3 corresponds to the second size, and A4 corresponds to the first size. A case where the pattern of the document having the second size falls in the first size means that the minimum rectangular region (for example, G201) including the pattern of the document having the second size is included in the region (for example, G202) corresponding to the first size.

When it is assumed that the second-size document is copied on the output sheet having the first size at the reduced magnification, a reduction determination of the document having the second size is to determine whether or not the mark included in the document having the second size illustrated in FIG. 2 is identifiable by the user on the output sheet having the first size. In the present embodiment, it is determined whether or not the mark is identifiable by the user by using a learned model produced by performing machine learning based on training data including an image indicating the read document and the size of the output sheet on which the document is actually copied. The details will be described below.

In both the first case and the second case, when it is determined to be available in the trimming determination of the second-size document (see (b) and (e) of FIGS. 2 and 3), the processor 10 decides that the size of the output sheet is the first size. The processor 10 copies the document having the second size on the output sheet having the first size such that the pattern of the document having the second size is included in the first size by cutting off at least a part of a portion other than the pattern (cutting off a region other than G202 in the example of G2 of FIG. 3). A trimmed portion by trimming the pattern in a range corresponding to the first size is printed on the output sheet having the first size without missing the pattern of the document having the second size. The processor 10 copies the document having the first size on the output sheet having the first size at the equal magnification. Accordingly, in this case ((b) and (e)), the pattern included in the document having the second size can be copied on the output sheet without being missed. Since both the document having the second size and the document having the first size are copied on the output sheet having the first size, it is possible to suppress the cost for the output sheets compared to a case where both the documents are copied on the output sheet having the second size.

When the trimming determination for the document having the second size is unavailable and the reduction determination for the document having the second size is available (see (c) and (f) of FIGS. 2 and 3), the processor 10 copies the document having the second size on the output sheet having the first size at the reduced magnification, and copies the document having the first size on the output sheet having the first size at the equal magnification. Since the reduction determination is available, the mark included in the document having the second size is identifiable on the output sheet having the first size copied at the reduced magnification. Since both the document having the second size and the document having the first size are copied on the output sheet having the first size, it is possible to suppress the cost for the output sheets compared to a case where both the documents are copied on the output sheet having the second size.

When the trimming determination for the document having the second size is unavailable and the reduction determination for the document having the second size is also unavailable (see (d) and (g) of FIGS. 2 and 3), the processor 10 copies the document having the second size on the output sheet having the second size at the equal magnification, and copies the image having the second size generated by adding a margin to the image of the document having the first size on the output sheet having the second size at the equal magnification. Accordingly, in this case, the mark included in the document having the second size has the same size as the document on the output sheet having the second size. Since the document having the first size is copied at the equal magnification by adding the margin so as to have the second size without being enlarged to the second size, the consumption of the recording agents does not increase compared to a case where the document is copied on the output sheet having the first size. Thus, it is possible to suppress the costs for the recording agents.

As stated above, even though the document having the second size is read before or after the document having the first size, the processor 10 decides the size of the output sheet depending on the analysis result of the image of the document having the second size. It is possible to copy two documents having different sizes on the output sheets having the same size by copying the first document and the second document on the output sheets having the decided size. That is, according to the present embodiment, printouts on which two documents having different sizes from each other are copied on the output sheets having the same sizes are produced.

When both the first document and the second document have the second size, the size of the output sheet is decided as follows. When the trimming determination is available for both two documents (see (h) of FIG. 2), the processor 10 decides the size of the output sheet as the first size. The processor 10 trims the pattern in a range corresponding to the first size without missing the pattern for both the documents, and prints the trimmed images on both surfaces of the output sheet having the first size. Accordingly, in this case, it is possible to suppress the costs for the output sheets compared to a case where the double-sided copy of the documents is performed on both surfaces of the output sheet having the second size.

When the trimming determination for at least one document is unavailable and the reduction determination for both the documents are available (see (i) of FIG. 2), the processor 10 decides the size of the output sheet as the first size. The processor 10 reduces the sizes of both the documents to the first size, and prints both the documents on both surfaces of the output sheet having the first size. Accordingly, in this case, it is possible to suppress the costs for the output sheets compared to a case where the double-sided copy of the documents is performed on both surfaces of the output sheet having the second size.

When the trimming determination for at least one document is unavailable and the reduction determination for at least one document is also unavailable (see (j) of FIG. 2), the processor 10 decides the size of the output sheet as the second size. The processor 10 prints both the documents on both surfaces of the output sheet having the second size at the equal magnification. Accordingly, in this case, it is possible to prevent a part of the pattern included in the document from being copied on the output sheet in a missed state or the mark included in the document from being copied on the output sheet with a size of being hardly identified by the user. As a result, it is possible to prevent the costs for the recording agents or the output sheets required for copying the document again from increasing.

The processor 10 can obtain the sizes of the output sheets corresponding to the sheet feed trays included in the copying apparatus 1 and information indicating whether or not there are the output sheets, and can select the size of the output sheet from the sizes of the present output sheets so as to correspond to the sheet feed tray. For example, when the A3 output sheet and the A4 output sheet are retained in two sheet feed trays (cassettes), the processor 10 can obtain A3 and A4 as the sizes of the output sheets corresponding to the sheet feed trays. The processor 10 can decide any of A3 and A4 as the size of the output sheet according to the aforementioned policies. When the A4 output sheet is not present in the A4 sheet feed tray (the sheets run out), the processor does not decide A4 as the size of the output sheet.

Next, a configuration in which the reduction determination for the document having the second size is performed by using a machine learning model will be described. The reduction determination for the document having the second size is to determine whether or not the mark included in the document having the second size is identifiable by the user on the output sheet having the first size (output sheet copied at the reduced magnification) when it is assumed that the document having the second size is copied on the output sheet having the first size at the reduced magnification. When the copy is performed, the copying apparatus 1 has a function of transmitting, as training data, data related to the performed copying to the learning server 100 and obtaining a model on which the machine learning is performed by using the training data from the learning server 100. In order to realize this function, the processor 10 can perform a training data output unit 10*a* and a learned model obtaining unit 10*b*.

In the present embodiment, when the size of the output sheet (the size smaller than the document) is manually designated by the user and the reduction copy is performed, the mark copied at the reduced magnification on the output sheet having the size designated by the user is deemed to be likely to have the size or thickness identifiable by the user. That is, when a copy start (reduction copy) command is input in a state in which the user manually designates the size of the output sheet smaller than the document and sets the number of sheets to be copied as multiple sheets, the mark copied on the output sheet having the size designated by the user is deemed to be highly likely to have the size or thickness identifiable by the user. When the number of sheets to be copied is set as multiple sheets, the mark copied on the output sheet having the size designated by the user is deemed to be more likely to have the size or thickness identifiable by the user than when the number of sheets to be copied is one, and the image of the document and the size of the output sheet in this case are adopted as a part of the training data.

When the copy is performed, the training data output unit 10*a* causes the processor 10 to realize a function of outputting the training data including a combination of the image of the copied document and the size of the output sheet on which the document is actually copied to the learning server 100 through the communication unit 30. Specifically, when the copy start (reduction copy) command is input in a state in which the user designates the size of the output sheet smaller than the document and sets the number of sheets to be copied as multiple sheets, the processor 10 transmits, as the training data, the image indicating the read document, the size of the document, a reading resolution of the document, and the size (that is, the size of the output sheet manually set by the user) of the output sheet on which the document is actually copied to the learning server 100.

The learned model obtaining unit 10*b* causes the processor 10 to realize a function of obtaining the learned model generated as a result of the machine learning from the learning server 100 through the communication unit 30. A learning process to be described below is performed in the learning server 100 based on the training data transmitted from the copying apparatus 1 to the learning server 100. Due to the use of the learned model obtaining unit 10*b*, the processor 10 can obtain the learned model 120*a* optimized by the learning process from the learning server 100.

As will be described below, in the model according to the present embodiment, the image indicating the document is used as an input, and the size of the output sheet is used as an output. The processor 10 inputs the image of the read document to the learned model 120*a*, and obtains the size of the output sheet as the output from the learned model 120*a* at the time of the reduction determination for the document having the second size. The size of the output sheet output from the learned model 120*a* is used in the reduction determination.

2. Configuration of Learning Server:

The learning server 100 is a computer that outputs the learned model obtained as the result of the machine learning to the copying apparatus 1 by using the machine learning based on the training data collected from the copying apparatus 1. The learning server 100 includes a control unit 110 that includes a CPU, a RAM, and a ROM, a recording medium 120, and a communication unit 130.

The control unit 110 functions as a training data obtaining unit 110*a*, a learning unit 110*b*, and a learned model output unit 110*c* by executing a machine learning program (not illustrated) recorded in the recording medium 120, and can perform functions related to the machine learning.

The control unit 110 can perform a function of obtaining training data 120b by the function of the training data obtaining unit 110a. The training data 120b is transmitted to the learning server 100 by the process of the training data output unit 10a from the copying apparatus 1. In the present embodiment, the training data obtained from the copying apparatus 1 by the learning server 100 is a data including the image of the document at the time of the reduction copy for the multiple sheets, the size of the document, the reading resolution of the document, and the size (the size of the output sheet on which the document is actually copied at the reduced magnification) of the output sheet designated by the user. In the learning server 100, this training data is learned as training data indicating that the mark (a mark in a state in which the mark included in the document is reduced) copied on the output sheet having the designated size is identifiable by the user.

When the training data 120b is received from the copying apparatus 1, the control unit 110 accumulates the received training data in the recording medium 120. When the training data 120b is accumulated, a model for estimating the size of the output sheet from the image can be generated by the machine learning.

Figure 4:
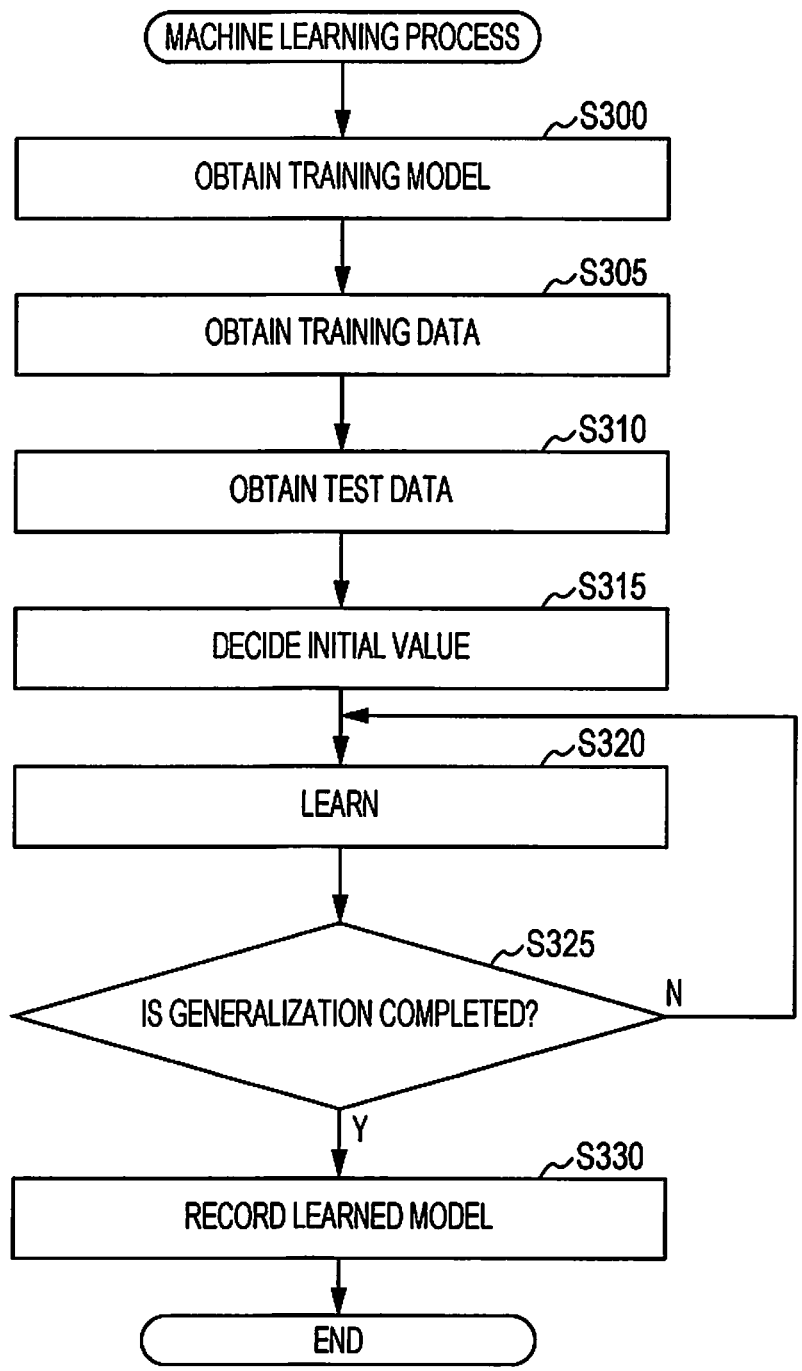
FIG. 4 is a flowchart of a machine learning process.

FIG. 4 is a flowchart illustrating the machine learning process. The machine learning process may be performed at any timing after the predetermined quantity of training data 120b is accumulated. When the machine learning process is started, the control unit 110 obtains a training model 120d by the function of the learning unit 110b (step S300). Here, the model is information indicating an expression for deriving a correspondence between data of an estimation target and data of an estimation result. In the present embodiment, an example of a model in which the data of the estimation target is image data (or data (features of the image) calculated from the image data) indicating the document read by the copying apparatus 1 and the size of the output sheet is the data of the estimation result will be described.

Figure 5:
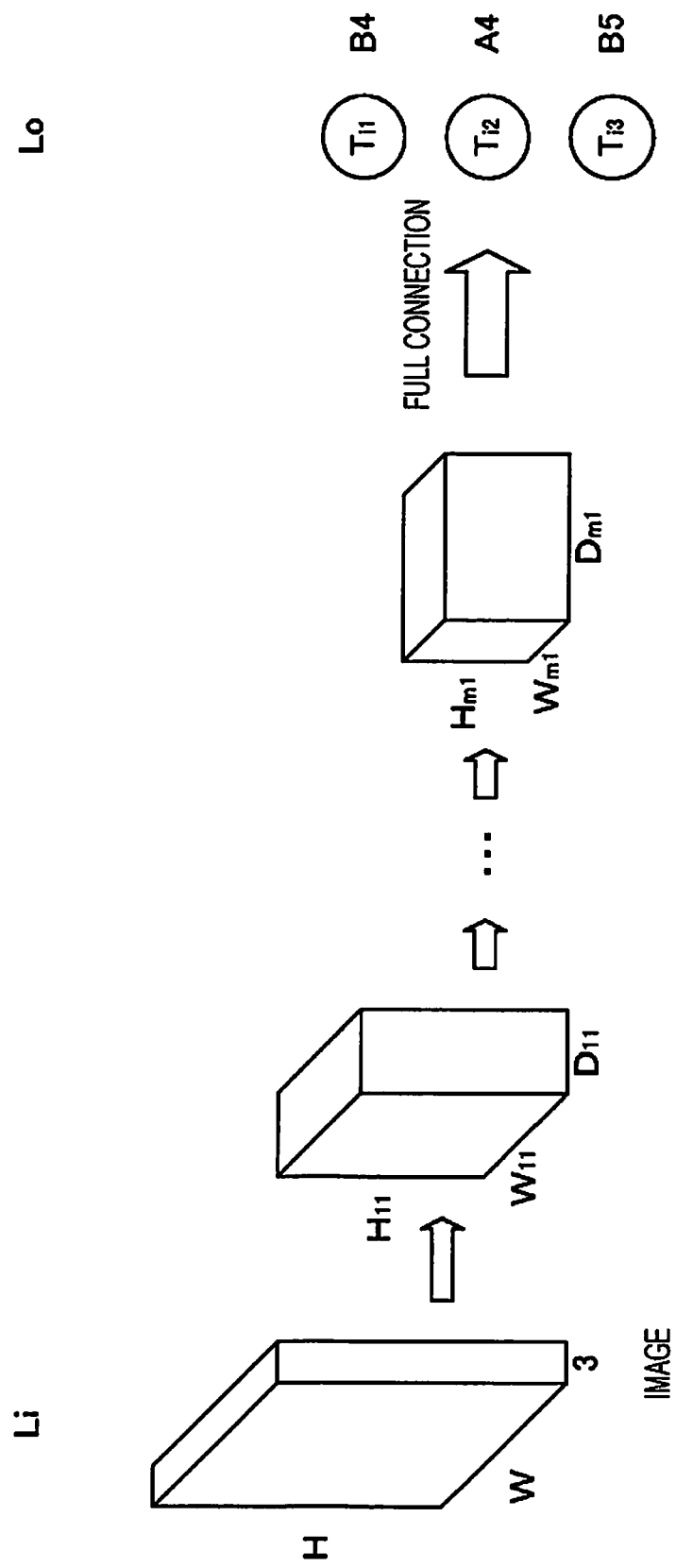
FIG. 5 is a diagram illustrating an input and an output of a machine learning model.

The model can be variously defined when input data is converted into output data. FIG. 5 is a schematic diagram illustrating a structure of a convolutional neural network (CNN) which is an example of the model used in the present embodiment. In FIG. 5, changes of a data format due to the CNN are represented by rectangles, and nodes of a normal neural network are represented by white circles. That is, in FIG. 5, an output layer $L_o$ is a normal neural network, and a higher layer than the output layer $L_o$ is the CNN.

In FIG. 5, a leftmost layer is an input layer $L_i$, a rightmost layer is an output layer $L_o$, and a neural network between these layers is schematically depicted. In the present embodiment, a model in which the image data indicating the document is input data for the input layer $L_i$ and the output data indicating the size of the output sheet is output from the output layer $L_o$ is constructed. Since the number of pixels of the image of the document varies depending on the size of the document and the reading resolution, the model is constructed for each size of the document and each reading resolution in the present embodiment. For example, a model for a first resolution of the A3 document, a model for a second resolution of the A3 document, a model for a first resolution of the B4 document, and a model for a second resolution of the B4 document may be assumed. A model to be applied is selected from the reading resolution and the size of the document included in the training data. FIG. 5 illustrates the input and the output of the model for the first resolution of the A3 document. The image has a H pixel width and a W pixel width, and gradation values of three channels of R: red, G: green, and B: blue are defined for the pixels. Accordingly, in FIG. 5, the image of the input layer $L_i$ is schematically depicted by a rectangle having a height H, a width W, and a depth 3. For example, image data obtained by converting the image of the document into a grayscale image may be input to the input layer $L_i$. The model may be constructed for each size of the document and each reading resolution. In the present embodiment, the model may be constructed for at least each size of the document, and the image of the document of which the resolution is converted so as to match the number of pixels of the input layer $L_i$ may be input to the model.

In FIG. 5, an example in which after the image is input to the input layer, the image is converted into $H_{11} \times W_{11} \times D_{11}$ number of output values through the CNN, that is, convolution calculation using a predetermined size and a predetermined number of filters, a calculation using an activation function, and a calculation of a pooling layer is illustrated. In FIG. 5, an example in which the image is subsequently converted into $H_{m1} \times W_{m1} \times D_{m1}$ number of output values through a plurality of layers (not illustrated) is illustrated.

The output data from the output layer $L_o$ indicates the size of the output sheet. The output may have the size capable of being selected as the size of the output sheet on which the A3 document is copied at the reduced magnification in the copying apparatus 1, and for example, three sizes of B4, A4, and B5 are assumed in the present embodiment. B4, A4, and B5 are associated with three nodes of the output layer $L_o$. After $H_{m1} \times W_{m1} \times D_{m1}$ number of output values are obtained by the CNN, an output value indicating the size of the output sheet is obtained through full connection.

In the output layer $L_o$, as the output value of each node becomes larger, it is estimated that this output value is appropriate as the size of the output sheet at the time of copying the input image of the A3 document at the reduced magnification. More specifically, when output values at nodes $T_{i1}$ to $T_{i3}$ are respectively 0.05, 0.9, and 0.05, it is estimated that A4 corresponding to the node $T_{i2}$ is the size of the output sheet capable of identifying the mark even at the reduced magnification.

The output nodes of the model for the second resolution of the A3 document may be three indicating B4, A4, and B5 similarly to the model for the first resolution of the A3 document. The output nodes of the models for the first resolution and the second resolution of the B4 document may be the sizes capable of being selected as the size of the output sheet on which the B4 document is copied at the reduced magnification in the copying apparatus 1, and may be two sizes of A4 and B5.

In step S300 of the flowchart illustrated in FIG. 4, the training model is obtained. In the present embodiment, since the model is constructed for each size of the document and each reading resolution, the processes of FIG. 4 are performed for each model. Here, the training indicates a learning target. That is, in the training model, document image data is input and the size of the output sheet is output, but the correspondence between the document image data and the size of the output sheet is not accurate at the beginning. That is, in the training model, the number of layers constituting the node or the number of nodes is determined, but parameters (weights or a biases) for defining the relationship between the input and the output is not optimized. These parameters are optimized during the machine learning (that is, are trained).

The training model may be decided in advance, or may be obtained by being input by an operator who operates the learning server 100 by operating the UI unit included in the learning server 100. In any case, the control unit 110 obtains, as the training model, the parameter of the neural network that outputs the size of the output sheet based on the document image data, as in the example illustrated in FIG. 5.

Subsequently, the control unit 110 obtains the training data by the function of the learning unit 110b (step S305). In the present embodiment, as described above, the training data 120b is transmitted in advance from the copying apparatus 1, and is recorded in the recording medium 120. Thus, the control unit 110 obtains the training data 120b while referring to the recording medium 120. For example, when the processes of FIG. 4 are performed for the model for the first resolution and the A3 document, the training data 120b of the first resolution of the A3 document is obtained. Subsequently, the control unit 110 obtains test data by the function of the learning unit 110b (step S310). In the present embodiment, a part of the training data is extracted from the training data 120b, and the extracted part is the test data. The test data is not used in the training.

Subsequently, the control unit 110 decides an initial value by the function of the learning unit 110b (step S315). That is, the control unit 110 gives the initial value to a variable parameter of the training model obtained in step S300. The initial value may be decided by various methods. For example, a random value or 0 can be used as the initial value, and thus, the initial value may be decided with different ideas such as a weight and a bias. Of course, the initial value may be adjusted such that the parameter is optimized during the learning.

Subsequently, the control unit 110 performs the learning by the function of the learning unit 110b (step S320). That is, the control unit 110 inputs the document image data of the training data 120b obtained in step S305 to the training model obtained in step S300, and calculates the output value of the output layer $L_o$. The control unit 110 specifies an error by a loss function indicating an error between the output size of the output sheet and the size of the output sheet indicated by the training data 120b. The control unit 110 repeats a process of updating the parameter based on differential using the parameter of the loss function by a predetermined number of times. For example, when there is the training data including an image G3 indicating the A3 document and A4 indicating the size of the output sheet, the parameter is updated such that the output (B4, A4, B5) obtained by inputting the image G3 to the model approach (0, 1, 0).

Of course, various functions can be adopted as the loss function, and for example, a cross-entropy error can be adopted. A process of calculating the loss function described above is performed for the image included in the training data 120b in whole or part, and the loss function in one learning is expressed by an average or a total thereof. When the loss function in one learning is obtained, the control unit 110 updates the parameter by a predetermined optimization algorithm, for example, a stochastic gradient descent method.

As stated above, when the parameter is updated by the predetermined number of times, the control unit 110 determines whether or not the generalization of the training model is completed (step S325). That is, the control unit 110 inputs the image data indicated by the test data obtained in step S310, and obtains an output indicating a setting. The control unit 110 obtains a degree of matching of the output setting and the setting corresponding to the test data. In the present embodiment, when the degree of matching is equal to or greater than a threshold, the control unit 110 determines that the generalization is completed.

The validity of a hyperparameter may be verified in addition to the evaluation of generalization performance. That is, in a configuration in which a hyperparameter which is a variable quantity other than the weight and the bias, for example, the number of nodes is tuned, the control unit 110 may verify the validity of the hyperparameter based on verification data. The verification data may be extracted from the training data by the same process as that of step S310. Of course, similarly to the test data, the verification data is also not used in the training.

When it is not determined that the generalization of the training model is completed in step S325, the control unit 110 repeats step S320. That is, the weight and the bias are further updated. Meanwhile, when it is determined that the generalization of the training model is completed in step S325, the control unit 110 records the learned model (step S330). That is, the control unit 110 records, as the learned model 120a, the training model in the recording medium 120. The control unit 110 transmits the learned model 120a to the copying apparatus 1 through the communication unit 130 by the process of the learned model output unit 110c.

With the aforementioned configuration, it is possible to produce the model (learned model 120a) for estimating the size of the output sheet appropriate to copy the document at the reduced magnification. It is possible to estimate the size of the output sheet appropriate for the reduction copy of the document by inputting the document image data indicating the document to the learned model 120a and obtaining information indicating the size of the output sheet. The sum of the output values of the nodes of the output layer $L_o$ is normalized to be 1. A threshold (for example, 0.9) may be determined in advance, and it may be estimated that the size corresponding to the node from which the value equal to or greater than the threshold is output is the size appropriate for the reduction copy of the document.

For example, at the time of copying in the copying apparatus 1, it is assumed that the output (B4, A4, B5) obtained by inputting the document image data indicating the read A3 document to the learned model 120a is, for example, (0.7, 0.2, 0.1). In this case, it is possible to estimate that all these sizes of the output sheet are not appropriate as the size of the output sheet on which the A3 document is copied at the reduced magnification (since all these output values of the nodes are less than the threshold). In such a case, it is possible to estimate that the read A3 document is not appropriate for the reduction copy and is appropriate to be copied on the output sheet having the same size as the A3 size of the document at the equal magnification (reduction determination: unavailable).

For example, when the output (B4, A4, B5) obtained by inputting the document image data indicating the read A3 document to the learned model 120a is, for example, (0.09, 0.9, 0.01), it is possible to estimate that A4 is appropriate as the size of the output sheet on which the read A3 document is copied at the reduced magnification. For example, when the output (B4, A4, B5) obtained by inputting the document image data indicating the read A3 document to the learned model 120a is, for example, (0.9, 0.09, 0.01), it is possible to estimate that B4 is appropriate as the size of the output sheet on which the read A3 document is copied at the reduced magnification.

Figure 6A:
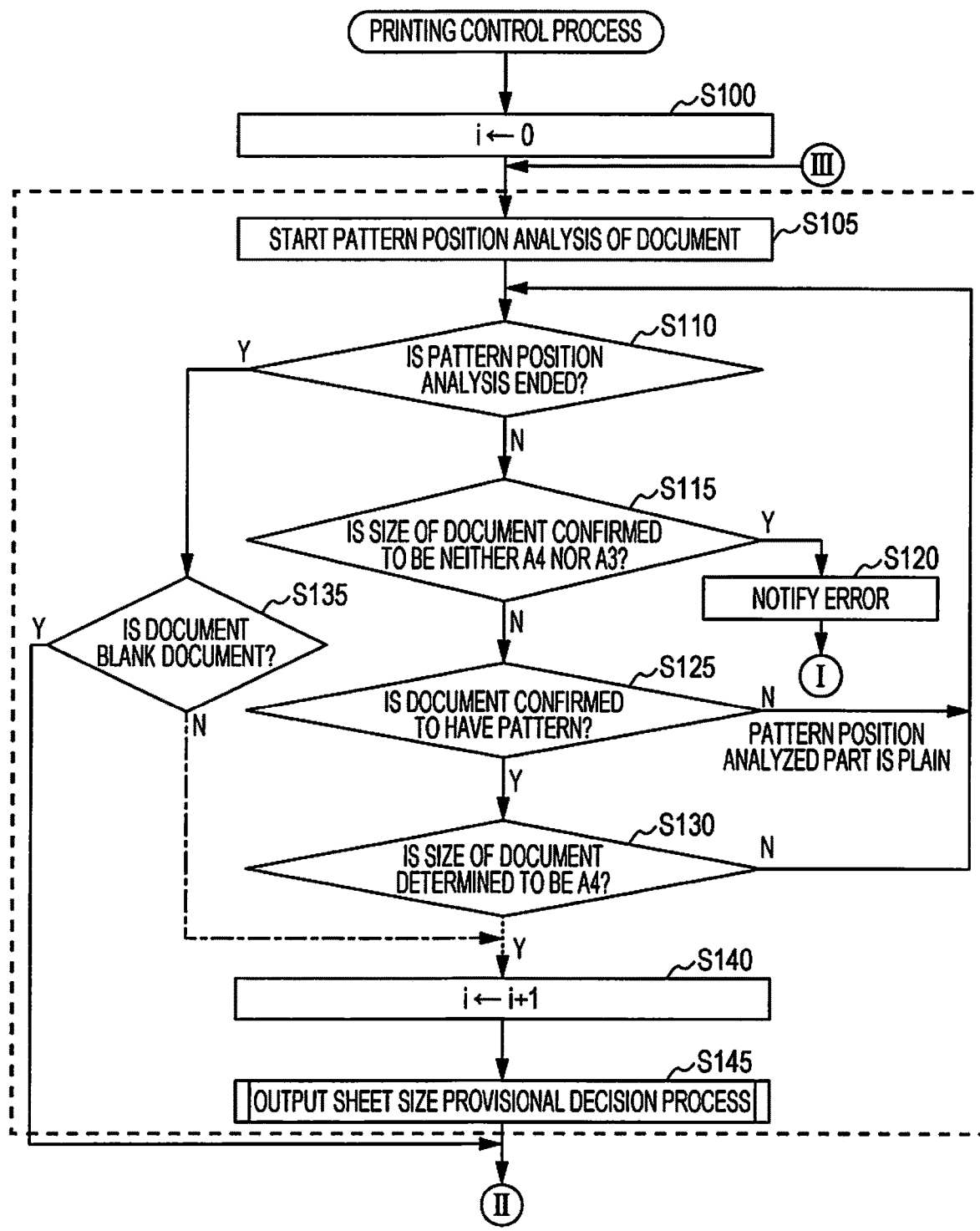
FIGS. 6A and 6B are flowchart of a printing control process.
Figure 6B:
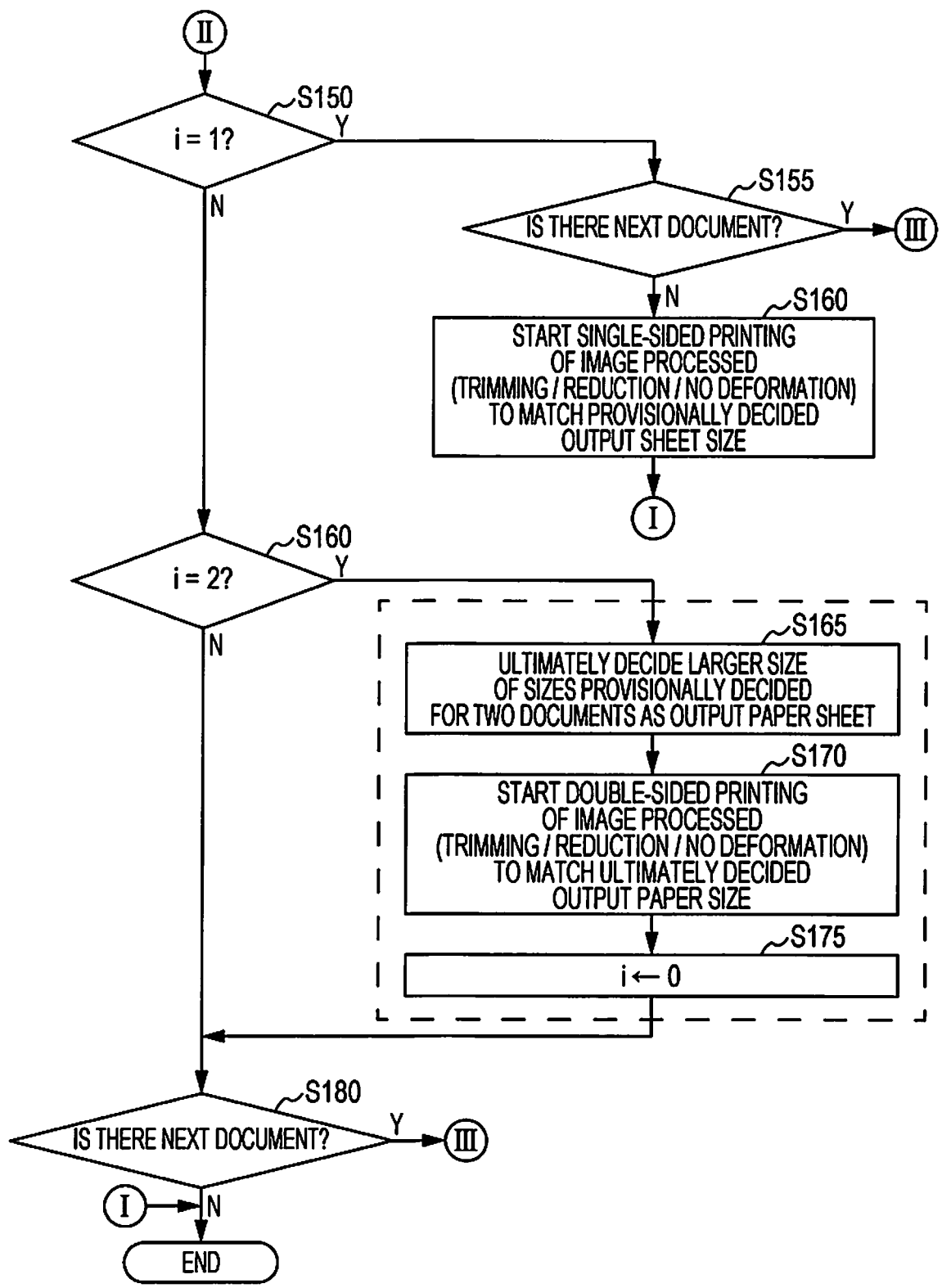

3. Printing Control Process:

NOW FIGS. 6A and 6B are flowchart illustrating a printing control process when the double-sided copy of the single-sided documents is performed. When all the following conditions 1 to 4 are satisfied, the printing control process of FIGS. 6A and 6B is a process started in response to the start of the accumulation of the document image in the memory according to the copy start command input by the user. Condition 1 is that the "single-side/double-side" setting is set as "single-side->double-side". Condition 2 is that the "size-mixed document loading" setting is set as "on". Condition 3 is that the documents are set in the ADF document tray and the maximum size of the set documents is confirmed to be A3 by the output of the ADF document sensor. Condition 4 is that the output sheets set two sheet feed trays are respectively A3 and A4.

When the copy start command is input by the user, a document reading process (not illustrated) is started. That is, the document reading process and the printing control process of FIGS. 6A and 6B are performed in parallel after the copy start command is received. The document reading process is a process performed by the function of the document reading unit 10c, and is a process of sequentially transporting and reading the documents and accumulating the images indicating the documents in the memory when there are the documents in the ADF document trays and there is a space in the memory in which the images indicating the read documents are accumulated. The document reading process is started according to the copy start command, and the printing control process of FIGS. 6A and 6B is started in response to the start of the accumulation of the first document image in the memory by the document reading process.

In the printing control process of FIGS. 6A and 6B, steps S105 to S145 are processing blocks for provisionally deciding the size of the output sheet by analyzing one document image. At least a pattern position analysis to be described below is included in the document image analysis, and a calculation process using the learned model 120a is included in some cases. When S105 to S145 are performed for two documents, the size of the output sheet is provisionally decided for two documents. Steps S165 to S175 are processing blocks for ultimately deciding the size of the output sheet based on the provisionally decided size of the output sheet for these two documents and printing the documents on both surfaces of the output sheet having the ultimately decided size one by one.

In the present embodiment, a blank document is skipped. In the case of the A3 document which is not the blank document, since it is necessary to analyze the position of the pattern for the entire region of the A3 reading surface, S110: N to S130: N are repeated until the analysis of the entire region of the reading surface is ended (S110: Y). In the case of the A4 document which is not the blank document, S110: N to S130: N are repeated until the size of the document is confirmed to be A4 (S130: Y). In the case of the blank A3 document and the blank A4 document, S110: N to S125: N are repeated until the pattern position analysis for the entire region of the reading surface is ended (S110: Y), that is, until it is confirmed that there is not pattern for the entire region of the reading surface.

In the present embodiment, the combinations of the document sizes capable of being mixedly loaded are limited. For example, A series such as A3 and A4 of which one short side and the other long side match each other can be combined. Similarly, B series such as B4 and B5 of which one short side and the other long side match each other can be combined. However, for example, when the A series document and the B series document are mixedly loaded, an error occurs. Since FIGS. 6A and 6B are the printing control process in which it is assumed that the A3 document and the A4 document are mixedly loaded, when not the A4 and A3 documents but the B4 documents are mixedly loaded, S110: N to S130: N are repeated until it is determined as Y in S115, but an error is notified when the document is confirmed to be neither A4 nor A3 (S115: Y).

Next, the steps of the printing control process of FIGS. 6A and 6B will be described in detail. When the printing control process is started, the processor 10 initializes a variable i to 0 (step S100). Since the printing control process is a process of copying the single-sided documents on front and rear surfaces of one output sheet one by one, the number of single-sided documents necessary for the double-sided copy of one output sheet is two. The variable i is used for counting the number of non-blank single-sided documents to be read. A range of the value of the variable i is $0 \leq i \leq 2$. In the present printing control process, when the blank single-sided document (the document of which the reading surface is blank) is mixed, this document is not copied (the reading is skipped). Accordingly, when the document is blank, the variable i is not counted up.

Subsequently, the processor 10 starts the pattern position analysis of the document (step S105). That is, the processor 10 starts a process of obtaining the position of the pattern on the document image based on the image data sequentially accumulated in the memory by the document reading unit 10c. When the image data of the entire reading surface of the document is accumulated in the memory, the position of the rectangular region (for example, G201 of FIG. 3) in which the pattern of the entire reading surface of the document is present can be obtained.

It is possible to detect edges of the document in the transporting direction and the direction perpendicular to the transporting direction during the transporting of the document. When four edges are detected, the processor 10 can obtain the size of the document based on a distance of the facing edges. For example, it is possible to obtain the length of the document in the transporting direction based on a rotation speed of a roller from when a start edge of the document in the transporting direction is detected to when an end edge is detected. For example, both edges in the direction perpendicular to the transporting direction are detected, and thus, it is possible to obtain a length of the document in the direction perpendicular to the transporting direction from a distance between both the edges.

Subsequently, the processor 10 determines whether or not the pattern position analysis is ended (step S110). That is, the image data of the entire reading surface of the document is accumulated in the memory, and it is determined whether or not the obtainment of the position of the rectangular region (for example, G201 of FIG. 3) in which the pattern of the entire reading surface of the document is present is completed.

When it is not determined that the pattern position analysis is ended in step S110, the processor 10 determines whether or not the size of the document is confirmed to be neither A4 nor A3 (step S115). For example, it is determined whether or not the size of the document is confirmed to be neither A4 nor A3 based on the distance between the facing edges of the document which is detected during the transporting of the document. When it is determined that the size of the document is confirmed to be neither A4 nor A3 in step S115, the processor 10 notifies of an error (step S120), and ends the printing control process.

When it is not determined that the size of the document is confirmed to be neither A4 nor A3 in step S115), the processor 10 determines whether or not the presence of the pattern in the document is confirmed (step S125). That is, when it is detected that any pattern is present in the document through pattern position analysis, the processor 10 determines that the presence of the pattern in the document is confirmed. When the presence of any pattern in the document is not confirmed, that is, when the pattern position analysis of the entire reading surface of the document is not yet ended but the absence of the pattern for the analyzed portion is confirmed, the processor 10 does not determine that the presence of the pattern in the document is confirmed.

When it is not determined that the presence of the pattern in the document is confirmed in step S125, the processor 10 performs step S110. When it is determined that the presence of the pattern of the document is confirmed in step S125, the processor 10 determines whether or not the size of the document is confirmed to be A4 (step S130). It is determined whether or not the size of the document is A4 based on the distance between the facing edges of the document detected during the transporting of the document.

When it is not determined that the size of the document is confirmed to be A4 in step S130, the processor 10 performs step S110. When it is determined that the analysis is ended in step S110, the processor 10 determines whether or not the document is blank (step S135). As the result of the pattern position analysis, when there is no pattern in the document, it is determined that the document is blank, and when there is any pattern in the document, it is not determined that the document is blank.

When it is determined that the document is blank in step S135, the processor 10 performs a process of step S150 to be described below. In the present embodiment, when the document is blank, the document is not copied (the reading is skipped). Accordingly, when it is determined that the document is blank in step S135, the value of the variable i is not changed.

When it is determined that the size of the document is confirmed to be A4 in step S130 ((A) and an arrow of a broken line of FIG. 6A) or it is not determined that the document is blank in step S135 ((B) and an arrow of a dashed dotted line of FIG. 6A), the processor 10 increases the value of the variable i by one (step S140). In the case of ((A) and the arrow of the broken line of FIG. 6A), the size of the read document (an i-th document after increment) is conformed to be A4. In the case of ((B) and the arrow of the dashed dotted line of FIG. 6A), the size of the read document is confirmed to be A3 from the fact that Condition 3 described above is satisfied, it is determined as N in step S115, and it is determined as N in step S130. In the case of (B), the pattern position analysis of the A3 document is ended (step S110: Y), but the case of (A) is a state in which the pattern position analysis of the A4 document is not necessarily ended. That is, in the case of (A), when the size of the document is confirmed to be A4 even though the pattern position analysis of the document is not ended, the next output sheet size provisional decision process or the subsequent output sheet size decision and printing start processes are performed.

Subsequently, the processor 10 performs the output sheet size provisional decision process (step S145). The output sheet size provisional decision process is a process of provisionally deciding the size of the output sheet appropriate for the document. At the time of performing the output sheet size provisional decision process for the i-th document in step S145, the size of the i-th document is confirmed to be any one of A3 and A4 as described in the case of (A) and the case of (B). The output sheet size provisional decision process is performed for the documents one by one. When the size of the output sheet is provisionally decided for each of two documents, the size of the output sheet is decided in step S165 to be described below based on the provisionally decided size of the output sheet. The details of the output sheet size provisional decision process will be described below.

Subsequently, the processor 10 determines whether or not the value of the variable i is 1 (step S150). That is, the processor 10 determines whether or not the size of the output sheet is determined for one single-sided document. When it is determined that the value of the variable i is 1 in step S150, the processor 10 determines whether or not there is the next document (step S155). That is, it is determined whether or not the image indicating the next document starts to be accumulated in the memory.

When it is determined that there is the next document in step S155, the processor 10 performs the process of step S105 (the value of the variable i is 1). That is, the next document pattern position analysis is started. When it is not determined that there is the next document in step S155, the processor 10 causes the printing unit 50 to start single-sided printing of the image processed so as to match the provisionally decided size of the output sheet (step S160), and ends the printing control process.

That is, step S160 is a process of printing the last single-sided document on one surface of the output sheet when the number of non-blank single-sided documents is an odd number. In step S160, the size provisionally decided in step S145 is decided as the size of the output sheet. For example, when the A3 document is decided to be copied on the A4 output sheet, a process of printing the image trimmed or reduced to the A4 size on the A4 output sheet is started. For example, when the A3 document is decided to be copied on the A3 output sheet or the A4 document is copied on the A4 output sheet, a process of printing the image of the document on the output sheet without trimming, enlarging or reducing the image is started.

When it is not determined that the value of the variable i is 1 in step S150, the processor 10 determines whether or not the value of the variable i is 2 (step S160). That is, it is determined whether or not the size of the output sheet is provisionally decided for each of two single-sided documents. When it is determined that the value of the variable i is 2 in step S160), the processor 10 ultimately decides, as the size of the output sheet, the larger size of the sizes provisionally decided for these two documents (step S165). On the assumption that the size of the output sheet provisionally decided for the first document is $Z_1$ and the size of the output sheet provisionally decided for the second document is $Z_2$, when ($Z_1$, $Z_2$) is (A3, A4), (A4, A3), or (A3, A3), the size of the output sheet is decided as A3. When ($Z_1$, $Z_2$) is (A4, A4), the size of the output sheet is decided as A4. That is, in the present embodiment, when at least any one of $Z_1$ and $Z_2$ is A3, the size of the output sheet is decided as A3, when both $Z_1$ and $Z_2$ are A4, the size of the output sheet is decided as A4.

Subsequently, the processor 10 causes the printing unit 50 to start the double-sided printing of the image processed so as to match the ultimately decided size of the output sheet (step S170). For example, when the copy of the A3 document on the A4 output sheet is ultimately decided, a process of printing the image trimmed or reduced to the A4 size on the A4 output sheet is performed (see, for example, the other surface of the A4 output sheet in (b) and (e) of FIG. 3 or the other surface of the A4 output sheet in (c) and (f)). For example, when the copy of the A3 document on the A3 output sheet is ultimately decided or the copy of the A4 document on the A4 output sheet is ultimately decided, a process of printing the image of the document on the output sheet without trimming, enlarging, or reducing the image is performed (see, for example, the other surface of the A3 output sheet in (d) and (g) of FIG. 3 or one surface of the A4 output sheet in (c) and (f)). When the copy of the A4 document on the A3 output sheet is ultimately decided, a process of printing the image enlarged to the A3 size by adding the margin to the image of the A4 document on the A3 output sheet is preformed (see, for example, one surface of the A3 output sheet in (d) and (g) of FIG. 3). It is possible to optionally set the position at which the trimming is performed or any position of A3 on which the image of the A4 document is disposed by adding the margin in a range in which the pattern is not missed.

Subsequently, the processor 10 sets the value of the variable i to 0 (step S175). After step S175 is performed or when it is not determined that the value of the variable i is 2 in step S160, the processor 10 determines whether or not there is the next document as in step S155 (step S180). When it is determined that there is the next document in step S180, the processor 10 performs step S105. When it is not determined that there is the next document in step S180, the processor 10 ends the printing control process.

Figure 7:
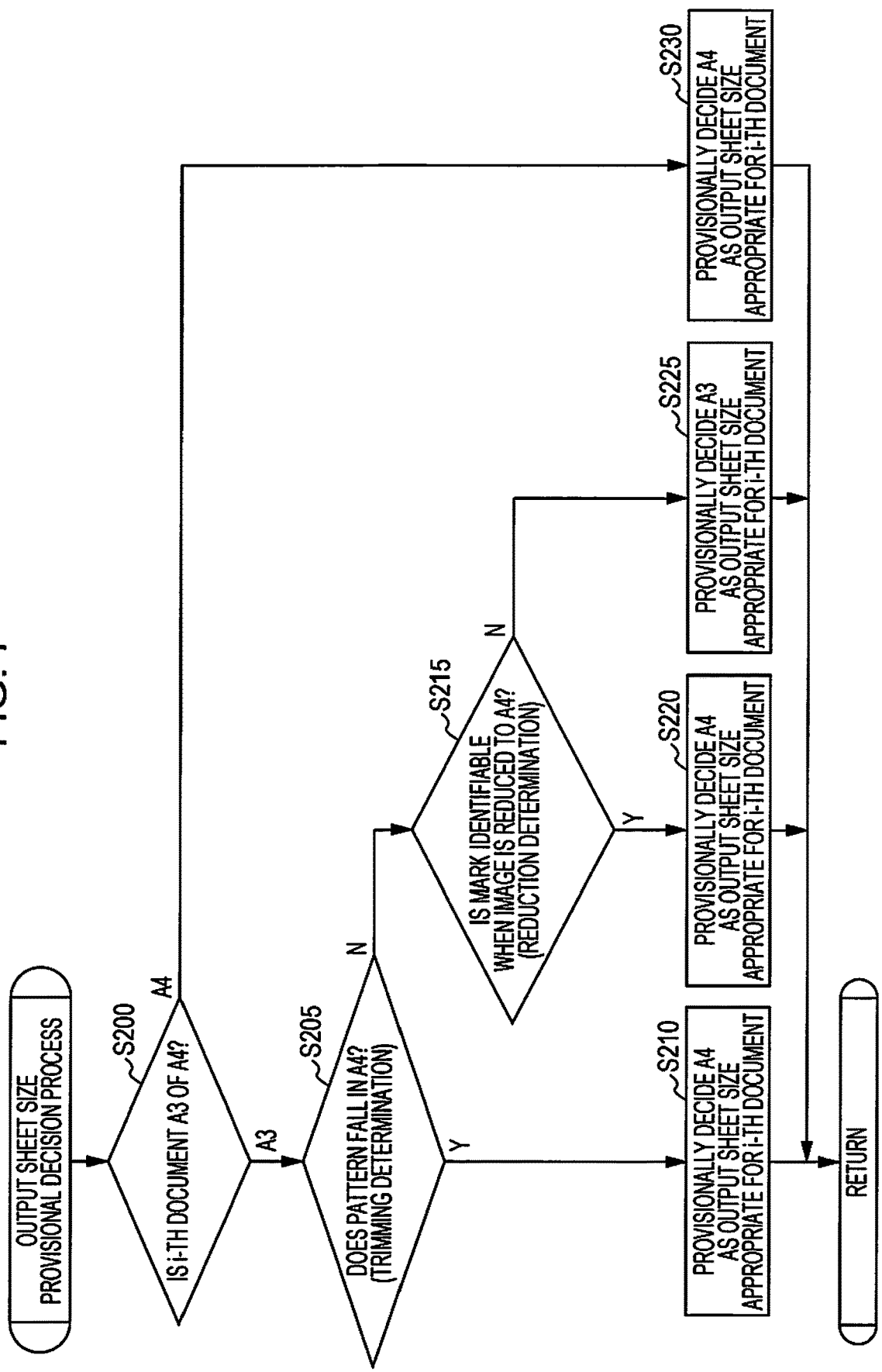
FIG. 7 is a flowchart of an output sheet size provisional decision process.

3-1. Output Sheet Size Provisional Decision Process:

FIG. 7 is a flowchart of the output sheet size provisional decision process performed in step S145 of the printing control process. When the output sheet size provisional decision process is started, the processor 10 determines whether the i-th document is A3 or A4 (step S200).

When it is determined that the i-th document is A3 in step S200, the processor 10 determines whether or not the pattern falls in A4 (trimming determination) (step S205). That is, it is determined whether or not the region (for example, G201 of FIG. 3) in which the pattern is present within the image of the i-th document is included in the rectangular region (for example, G202 of FIG. 3) having the size corresponding to A4 based on the result of the pattern position analysis.

When it is determined that the pattern falls in A4 in step S205, the processor 10 provisionally decides that the size of the output sheet appropriate for the i-th document is A4 (step S210). When it is not determined that the pattern falls in A4 in step S205, the processor 10 determines whether or not the mark is identifiable when the image is reduced to A4 (reduction determination) (step S215). That is, the processor 10 selects the learned model 120a corresponding to the size of the read document and the reading resolution, inputs the document image to the selected learned model 120a, and obtains the output result. The processor 10 determines whether or not the mark is identifiable when the image is reduced to A4 based on the output result.

For example, when all the output values of three nodes of the output layer $L_o$ illustrated in FIG. 5 are less than the threshold or only B4 larger than A4 (the planned size of the output sheet) is equal to or greater than the threshold, the processor 10 determines that the A3 document is not able to be reduced to the A4 output sheet. For example, when any one of A4 and B5 is equal to or greater than the threshold, the processor 10 determines that the A3 document is able to be reduced to the A4 output sheet. Since B5 is smaller than A4 which is the planned size of the output sheet, when the document is reduced to B5 and the mark is identifiable, it is possible to estimate that the mark is identifiable even though the document is reduced to A4 larger than B5.

When the document is reduced to A4 and it is determined that the mark is identifiable in step S215, the processor 10 provisionally decides that the size of the output sheet appropriate for the i-th document is A4 (step S220).

When the document is reduced to A4 and it is not determined that the mark is identifiable in step S215, the processor 10 provisionally decides that the size of the output sheet appropriate for the i-th document is A3 (step S225). In the present embodiment, when step S225 is performed, the size of the output sheet is ultimately decided as substantially A3 (since the size of the output sheet is decided as A3 when at least any one of $Z_1$ and $Z_2$ is provisionally decided as A3). For example, when i=1 and S225 is performed, even though the next document is A3, the size of the output sheet may be ultimately decided as A3 without waiting until the analysis for the next document is ended. When it is determined that the i-th document is A4 in step S200, the processor 10 provisionally decides that the size of the output sheet appropriate for the i-th document is A4 (step S230).

Figure 8:
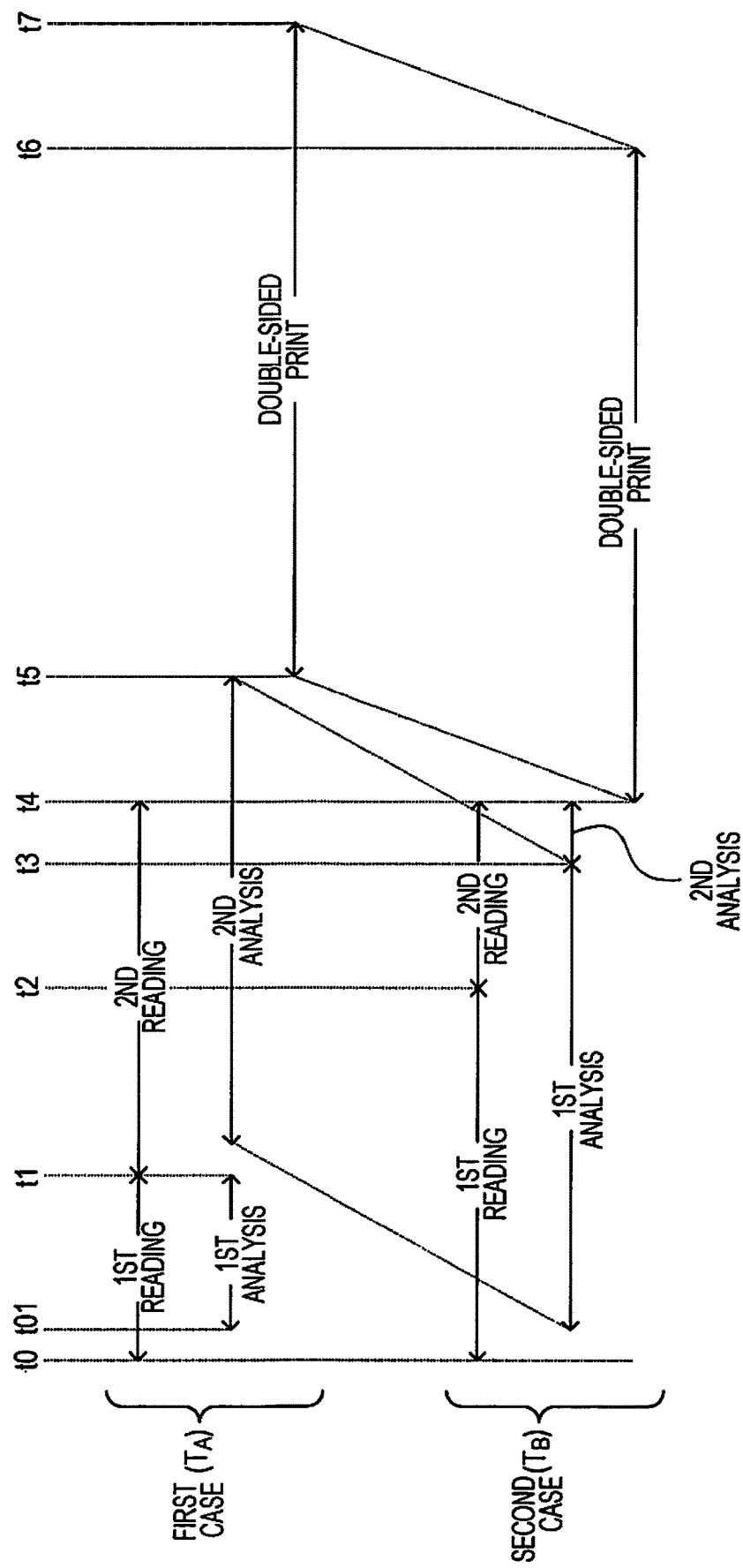
FIG. 8 is a timing chart illustrating an example of a copy operation in a first case and a second case.

$(T_A)$ of FIG. 8 is a timing chart illustrating a printing start timing when the first document is A4 and the second document is A3 (that is, first case), that is, the printing control process is performed. It is assumed that the A4 document and the A3 document are not blank. It is assumed that a reading start timing of the first document is t0. When the size of the first document is confirmed to be A4 (S130 of FIG. 6A and t1 of FIG. 8), the size of the output sheet for the first document is provisionally decided as A4. When the reading of the first document is ended, the reading of the second document is started. When the reading of the second document is ended (t4) and the analysis of the second document image is ended (t5), the size of the output sheet for the second document is provisionally decided. When the size of the output sheet for the second document is provisionally decided as A4, the size of the output sheet for performing the double-sided copy of the first document and the second document is ultimately decided as A4, and the A4 double-sided printing on the output sheet is started (step S170 and t5). That is, an operation for starting to feed one A4 output sheet from the cassette in which the A4 output sheet is accommodated is started.

$(T_B)$ of FIG. 8 is a timing chart illustrating a printing start timing when the first document is A3 and the second document is A4 (that is, second case), that is, the printing control process is performed. It is assumed that the A3 document and the A4 document are the same as the case of $(T_A)$ (the reading order is merely reversed). The documents are sequentially read and the document images are accumulated in the memory through the document reading process, and the order of the documents used in $(T_A)$ and $(T_B)$ is merely different. Thus, a time taken from the reading start (t0) of the first document to the reading end (t4) of the second document is the same in $(T_A)$ and $(T_B)$.

In $(T_B)$, the reading of the first document is started (t0), the reading of the first document is ended (t2), and then, the reading of the second document is started. The analysis of the first document image is ended with a delay after t2 (t3). At t3, the document size for the first document is provisionally decided. As in the example of $(T_A)$, since the first A3 document is the same as the second A3 document, the document size for the first A3 document is provisionally decided as A4 (t3). Subsequently, the analysis of the next document (second document) is started (t3). However, when the size of the second document is confirmed to be A4 (S130 of FIG. 6A and t4 of FIG. 8), the size of the output sheet for the second document is provisionally decided as A4. The size of the output sheet for performing the double-sided copy of the first document and the second document is ultimately decided as A4 based on the size of the output sheet provisionally decided for the first document and the size of the output sheet provisionally decided for the second document, and the double-sided printing on the A4 output sheet is started (step S170 and t4). That is, an operation for starting to feed one A4 output sheet from the cassette in which the A4 output sheet is accommodated is started.

In the present embodiment, after the analysis of the first document is ended, the analysis of the second document is performed. Since the ending of the analysis of the first document (A3) of ($T_B$) is continued even after the reading of the second document (A4) is started, the analysis start (t3) of the second document (A4) using the reading start (t2) of the second document (A4) as a reference is later than the analysis start (t01) of the first document (A4) using the reading start (t0) of the first document (A4) of ($T_A$) as a reference. However, when the document is confirmed to be A4, even though the analysis of the document image is not ended, the size of the output sheet is able to be provisionally decided as A4, and thus, a time assigned to the analysis of the A4 document in the case of ($T_B$) is shorter than in the case of ($T_A$). Thus, the printing start (t4) in the case of ($T_B$) is earlier than the printing start (t5) in the case of ($T_A$).

In both the case of ($T_A$) and the case of ($T_B$), since the order of the images to be printed on both surfaces of the output sheet is merely reversed, the time taken to perform the double-sided printing is deemed to be same. Accordingly, as the printing start of the case of ($T_B$) is earlier than in the case of ($T_A$), the ending of the double-sided printing is also earlier. t6 indicates the double-sided printing end in the case of ($T_B$), and t7 indicates the double-sided printing end in the case of ($T_A$). Therefore, according to the present embodiment, the time taken from the reading start of the first document to the copying end of the second document in the first case is larger than in the second case ((t7−t0)>(t6−t0)). In the present embodiment, the user can quickly obtain the printouts in both the second case and the first case compared to a configuration in which a configuration in which after the analysis for these two documents is ended, the size of the output sheet is ultimately decided. Accordingly, it is possible to improve the convenience of the user. In particular, when edge sensors that detect a front edge and a rear edge of the document are provided on an upstream side of the image sensor that reads the document in the transporting route of the document, it is possible to determine the size of the document based on outputs of the edge sensors. In this case, it is possible to start an operation for ultimately deciding the size of the output sheet as A4 before the reading of the second document is completed in the second case and starting to feed one A4 output sheet from the cassette in which the A4 output sheet is accommodated. Accordingly, the user can obtain the printouts particularly earlier than in the first case.

4. Other Embodiments

The aforementioned embodiment is an example for implementing the present disclosure. At the time of copying the document having the first size and the document having the second size on the output sheets having the same size, when the first document has the first size and the second document has the second size, the image of the second document is analyzed, and the first and second documents are copied on the output sheets having the sizes corresponding to the analysis result. When the first document has the second size and the second document has the first size, the image of the first document is analyzed, and the first and second documents are copied on the output sheets having the sizes corresponding to the analysis result. Only in this case, other various embodiments can be adopted. For example, the copying apparatus 1 may have the function of the learning server 100. Alternatively, the reduction determination using the learned model 120a may be performed by the learning server 100, and the copying apparatus 1 may obtain the determination result of the reduction determination from the learning server 100. The configuration of a part of the aforementioned embodiment may be omitted, or the order of the processes may be changed or omitted.

The document reading unit may read the document. That is, the document reading unit may read the document with the designated resolution, may generate the image indicating the document, and may accumulate the generated image in the memory. Alternatively, the document reading unit may transport and read the document set in the ADF document, may read the document loaded on the document stage glass, and may prompt the user to load the next document. It may be assumed that the mixedly loaded documents have various sizes including the documents having the B-series sizes such as B4 and B5 and the documents having the A-series sizes such as A3 and A4. Postcards or envelopes having various sizes may be included. For example, it may be assumed that the documents having the A-series sizes and the documents having the B-series sizes are mixedly loaded.

The printing control unit may be print the image of the read document on the output sheet. That is, the printing control unit may generate print data in a format appropriate for the printing in the printing unit included in the copying apparatus based on the image read by the document reading unit, and may perform the printing based on the print data.

At the time of copying the document having the first size and the document having the second size larger than the first size on the output sheets having the same size, when the first document has the first size and the second document has the second size, the printing control unit may analyze the image of the second document, and may copy the first and second documents on the output sheets having the sizes corresponding to the analysis result. When the first document has the second size and the second document has the first size, the printing control unit may analyze the image of the first document, and may copy the first and second documents on the output sheets having the sizes corresponding to the analysis result.

For example, when the pattern does not fall in the first size, the printing control unit may copy the document having the second size on the output sheet having the second size at the equal magnification, and the image having the second size generated by adding the margin to the image of the document having the first size may be copied on the output sheet having the second size at the equal magnification. That is, in the case of (c) or (f) of FIGS. 2 and 3, the size of the output sheet may be decided as the second size as in the case of (d) or (g), and the printing may be performed in the printing mode when the output sheet has the second size as in the case of (d) or (g). In this case, since the document having the second size is copied on the output sheet having the second size at the equal magnification, the pattern included in the document having the second size can be copied without missing the pattern. Since the document having the first size is copied at the equal magnification by adding the margin so as to have the second size without being enlarged to the second size, the consumption of the recording agents does not increase compared to a case where the document is copied on the output sheet having the first size. Thus, it is possible to suppress the costs for the recording agents.

The printing control unit may copy the first document and the second document on the output sheets having the same size, and a configuration in which the first document (or first page) is copied on one surface of one output sheet and the second document (or second page) is copied on one surface of another one output sheet may be assumed. For example, a phenomenon in which the first document (or first page) is copied on one surface of one output sheet and the second document (or second page) is copied on one surface of another one output sheet may occur not only when the "single-side/double-side" setting is "single-side->single side" but also when the "single-side/double-side" setting is "single-side->double-side".

For example, when a setting (for example, bookbinding mode) for printing all the documents having various sizes on the output sheets having the same size is "on", the process (output sheet size provisional decision process) of reading the document and provisionally deciding the size of the output sheet of each document for all the documents is performed for all the documents, and then the largest size of the output sheet sizes provisionally decided for all the documents is decided as the size of the output sheet.

The printing control unit may obtain the size of the mark by OCR, may compare the size of the mark with the threshold, and may determine whether or not the mark is identifiable by the user when the document having the second size is copied on the output sheet having the first size at the reduced magnification. For example, the printing control unit may input the document image to the OCR having a function of identifying a character included in the image or a function of detecting a character size, and may obtain the minimum character size of the character included in the document image. The printing control unit may obtain a reduction rate at the time of reducing the document having the second size on the output sheet having the first size, and may obtain the character size of the reduced character when the character having the minimum character size is reduced at the reduction rate. When the character size of the reduced character is equal to or greater than a threshold, the printing control unit may determine that the character is identifiable by the user when the document having the second size is copied on the output sheet having the first size at the reduced magnification. For example, the printing control unit may compare the character size when the character size for which the number of characters is largest among all the characters included in the document image is reduced at the reduction rate with the threshold. The size of the mark may include a thickness of a line in addition to the size of the character.

When the output sheet having the size corresponding to the analysis result is not feedable, the printing control unit may perform the printing on the output sheet having the size selected according to the analysis result from the size of the feedable output sheet. Alternatively, the printing control unit may allow the user to select any of the printing after the output sheet having the size corresponding to the analysis result and the printing on the output sheet having the size selected according to the analysis result from the size of the feedable output sheet, and may perform the printing according to the selection of the user. When the output sheet having the size corresponding to the analysis result is not feedable, a case where a paper jam error or a paper running out occurs or a case where the cassette corresponding to the output sheet of the ultimately decided size is not attached to the copying apparatus may be assumed. For example, in step S160 or S170 of FIG. 6B, the processor may suggest that the user determines whether or not the output sheet having the ultimately decided size is feedable before the printing is started, when the output sheet having the ultimately decided size is feedable, selects the output sheet which has the size equal to or greater than the ultimately decided size and has the smallest size from the feedable output sheets, and performs the printing on the output sheet having the selected size. Alternatively, the processor may prompt the user to supply the output sheet having the ultimately decided size. The processor may allow the user to select the printing on the output sheet having the ultimately decided size after the user is prompted to supply the output sheet having the ultimately decided size and or the printing on the output sheet having the size selected by the copying apparatus from the sizes of the feedable output sheets. By doing this, it is possible to copy the document on the output sheet of the size corresponding to the method selected by the user. Accordingly, it is possible to reduce a possibility that the document is copied on the output sheet having the size which is not intended by the user. When a predetermined time elapses with no selection of the user, the output sheet which is equal to or greater than the ultimately decided size and has the smallest size among the feedable output sheets may be automatically selected, and the printing may be performed on the output sheet having the selected size.

The printing control unit may select the size of the output sheet among the sizes of the sheets corresponding to the sheet feed trays. The printing control unit may select the size of the output sheet from the sizes of the sheets which corresponding to the sheet feed trays and are actually set. The number of sheet feed trays may be three or more, or the number of types of the sizes of the output sheets corresponding to the sheet feed trays may be three or more. In the aforementioned embodiment, when the document having the second size is copied on the output sheet having the first size, the document is trimmed without missing the pattern or is be reduced. However, the document may be trimmed without missing the pattern, the trimmed image may be reduced at the reduction rate corresponding to the size of the trimmed region and the size of the output sheet, and the printing may be printed on the output sheet.

The machine learning model for estimating the size of the output sheet appropriate to copy the document can be produced by various methods in addition to the aforementioned embodiment. The method of producing the machine learning model may collect, as the training data, the data including the image of the document and the size of the document or the size of the actually copied output sheet from the copying apparatus that copies the document on the output sheet, and may produce the model for determining whether or not the mark included in the image of the document is identifiable by the user on the document or the copied output sheet based on the training data through the machine learning.

That is, in the present producing method, it is possible to estimate that there is a high possibility that the mark included in the document is identifiable on the document. The machine learning concerned that the mark included in the document is identifiable on the output sheet having the same size as the document is performed by using the training data including the image of the document and the size of the document. In the present producing method, it is possible to estimate that there is a high possibility that the mark included in the document is identifiable on the actually copied output sheet. The machine learning concerned that the mark included in the document is identifiable on the output sheet having the size of the actually copied output sheet is performed by using the training data including the image of the document and the size of the actually copied output sheet.

The model generated by such a machine learning can be used in determining whether or not there is a high possibility that the mark is identifiable by the user on the output sheet when it is assumed that the document is copied on the output sheet having the planned size. When the document is copied on the output sheet having the planned size and there is a high possibility that the mark is identifiable by the user, the planned size of the output sheet is not appropriate. Accordingly, it is possible to increase a possibility that the document can be copied on the output sheet having the appropriate size by using the model produced by the present producing method.

Figure 9:
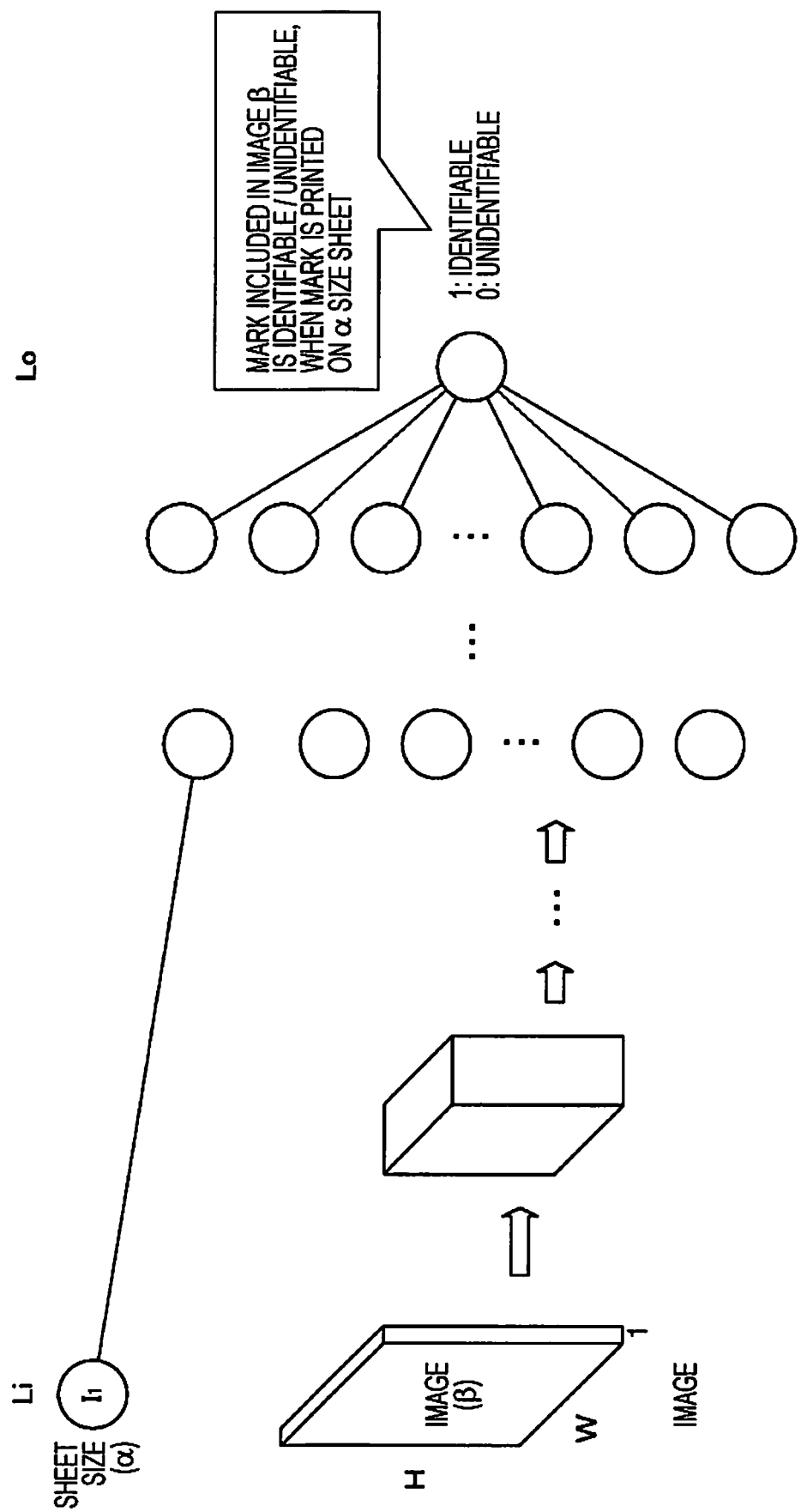
FIG. 9 is a diagram illustrating an input and an output of a machine learning model according to another embodiment.

FIG. 9 illustrates an example of the machine learning. In the model of the example of FIG. 9, inputs are a sheet size ($\alpha$) and image data ($\beta$) printed on the sheet having the corresponding size. In the model of FIG. 9, an output is a value indicating the mark included in the image data ($\beta$) is identifiable or not identifiable when the mark has the size when the mark is printed on the sheet having the size of ($\alpha$). This model is configured to learn a relationship between a balance of the size of the character for the entire image (that is, the entire sheet) as the size of the character identifiable by the user and the size of the sheet.

A range of the output value is 0 to 1. 1 indicates that the mark is identifiable, and 0 indicates that the mark is not identifiable. A threshold is set in advance, and when the output value is equal to or greater than the threshold (for example, 0.8), it is possible to estimate that the mark is identifiable. The image data ($\beta$) input to the model is an image of the document read at the time of copying in the copying apparatus 1 as will be described below. The number of pixels of the image data indicating the document varies depending on the size of the document or the reading resolution. Thus, before the image data is input to the model, a process of setting the number of pixels of the image data to be the number of input pixels (H×W×1 in FIG. 9) is performed as a pre-process. For example, the number of pixels when the image obtained by reading a predetermined any size (for example, A4) of the document sizes readable in the copying apparatus 1 with the predetermined first resolution into a grayscale may be assumed as the number of input pixels.

For example, when the A3 document is read with the first resolution, the gradation values of the pixels of the image which is reduced so as to have the number of input pixels and is converted into the grayscale are input. For example, when the A6 document is read with the first resolution, the gradation values of the pixels of the image which is enlarged so as to have the number of input pixels and is converted into the grayscale are input. A known algorithm may be adopted in the enlargement and reduction of the image, but an algorithm capable of being more smoothly enlarged and reduced is desirable.

For example, the sheet size ($\alpha$) and the image data ($\beta$) input to the model illustrated in FIG. 9 may be the size of the document copied by the copying apparatus 1 at the equal magnification or at the reduced magnification and the image data indicating the document. In this case, the copying apparatus 1 outputs the training data including the size of the document at the time of copying the document at the equal magnification or at the reduced magnification and the image data indicating the read document to the learning server 100. The learning server 100 collects, as the training data indicating that the mark is identifiable by the user in the document, the size of the document obtained from the copying apparatus 1 and the image data indicating the document.

When the document is copied at the equal magnification or at the reduced magnification, it is possible to estimate that there is a high possibility that the mark included in the document is identifiable by the user in at least the document. That is, it is possible to estimate that the size of the mark on the document is naturally identifiable when the mark is identifiable even though the document is copied on the output sheet having the same size or is copied at the reduced magnification since the mark is already identifiable on the document. The machine learning concerned that the mark is identifiable by the user on the output sheet when the document is copied on the output sheet having the same size as the size of the document at the equal magnification is performed by using the combination of the training data including the image of the document and the size of the document when the document is copied at the equal magnification or at the reduced magnification.

The sheet size ($\alpha$) and the image data ($\beta$) input to the model illustrated in FIG. 9 may be the size of the output sheet when the copying apparatus 1 actually copies the document by multiple sheets at the reduced magnification and the image data indicating the document. In this case, the copying apparatus 1 outputs the training data including the size of the output sheet when the document is actually copied by multiple sheets at the reduced magnification and the image data indicating the read document to the learning server 100. The learning server 100 collects, as the training data indicating that the mark is identifiable by the user on the copied output sheet, the size of the output sheet and the image data indicating the document obtained from the copying apparatus 1.

When the document including the mark is copied on the output sheet having the size smaller than the document by multiple sheets at the reduced magnification, it is possible to estimate that there is a high possibility that the reduced mark is identifiable by the user on the copied output sheet. That is, it is possible to estimate that since the mark is identifiable on the copied output sheet, the document is copied by multiple sheets (when the mark is not identifiable, the failure copy is not performed by multiple sheets). The machine learning concerned that the mark copied at the reduced magnification is identifiable by the user on the output sheet when the document is reduced with the size of the output sheet is performed by using the training data including the combination of the image of the data and the size of the output sheet when the document is copied on the output sheet having the size smaller than the document at the reduced magnification by multiple sheets.

The learned model 120*a* produced by the aforementioned machine learning can be used in determining whether or not there is a high possibility that the mark is identifiable by the user on the output sheet when it is assumed that the document is copied on the output sheet having the planned size. For example, since the copying apparatus 1 determines whether or not the read A3 document is reducible to A4 (is able to be copied on the A4 output sheet at the reduced magnification), when the output obtained by inputting the document image data ($\beta$) which is the document image data indicating the A3 document and is processed so as to have the number of input pixels and A4 ($\alpha$) which has the planned size of the output sheet to the learned model 120*a* is equal to or greater than a threshold, it is possible to estimate that the mark copied on the A4 output sheet at the reduced magnification is identifiable by the user even though the read A3 document is copied on the A4 output sheet at the reduced magnification. Thus, the processor 10 can determine that the mark included in the document is identifiable by the user on the output sheet at the reduced magnification when the A3 document is copied on the A4 output sheet at the reduced magnification (reduction determination: available).

For example, when the output obtained by inputting the document image data (β) which is the document image data indicating the read A3 document and is processed so as to have the number of input pixels and A4 (α) which is the planned size of the output sheet to the learned model 120a is, for example, less than the threshold, it is possible to estimate that the mark copied on the A4 output sheet at the reduced magnification is identifiable by the user when the read A3 document is copied on the A4 output sheet at the reduced magnification. Thus, the processor 10 can determine that the mark included in the document is identifiable by the user on the output sheet at the reduced magnification when the A3 document is copied on the A4 output sheet at the reduced magnification (reduction determination: unavailable).

The training data output unit may output, as the training data, the data including the image of the document and the size of the document or the size of the actually copied output sheet, and may perform the machine learning using the training data. The training data may include the image the document and the document size, or may include the image of the document and the size of the actually copied output sheet. The image of the document and the size of the document may include the size of the actually copied output sheet. The training data may include various setting values in the copying apparatus 1 at the time of other copying or various parameters or conditions related to the copying. In an apparatus which is an output destination of the output data, the output data may be recognized as the training data of the machine learning of the predetermined content, or data may be output at any timing or by any method.

The learned model obtaining unit may obtain the learned model produced by the machine learning. When the learned model is produced for each copy condition, a plurality of learned models may be obtained.

When it is assumed that the image of the document is copied on the output sheet having the planned size, the printing control unit may determine whether or not the mark is identifiable by the user on the output sheet by using the learned model before the copying, and may control the copying based on the determination result. The model may have various configurations, and when it is assumed that the image of the document is copied on the output sheet having the planned size, the printing control unit may determine whether or not the mark is identifiable by the user on the output sheet.

Although it has been described that it is determined whether or not the document is reduced and the optimum output sheet size is selected, the present disclosure may be applied to enlargement determination in addition to the reduction determination. That is, when it is estimated that it is difficult for the user to identify the mark of the A4 document with the original size and the mark is identifiable when the document is enlarged to A3, the processor may provisionally decide that the size of the output sheet is A3, may enlarge the image of the document to A3, and may perform the printing on the A3 output sheet. Such estimation may be performed based on the machine learning result based on the usage situation of the copying apparatus of the user. The copying apparatus may include the document reading unit that reads the document and the printing control unit that analyzes the image of the read document and prints the image on the output sheet having the size corresponding to the analysis result.

The aforementioned learning may be performed for each user, or the decision of the size of the output sheet based on the learning result may be performed for each user. The copying apparatus may have a user authentication function for identifying the user.

As in the present disclosure, a method performed such that the image of the second document is analyzed and the first and second documents are copied on the output sheets having the sizes corresponding to the analysis result when the first document has the first size and the second document has the second size and the image of the first document is analyzed and the first and second documents are copied on the output sheets having the sizes corresponding to the analysis result when the first document has the second size and the second document has the first size at the time of copying the document having the first size and the document having the second size on the output sheets having the same size can be applied as the program or the method. The aforementioned system, program, and method may be realized as a single apparatus, or may be realized by using components included in a plurality of apparatuses. That is, the aforementioned system, program, and method include various modes. A part thereof is software, or a part thereof is hardware. That is, the aforementioned system, program, and method may be appropriately changed. The disclosure is established as a recording medium of a program for controlling the system. Of course, the recording medium of the program may be a magnetic recording medium, may be a semiconductor memory, or may be applied to any recording media to be developed in the future.

What is claimed is:

1. A copying apparatus comprising:
a document reading unit that reads a document; and
a printing control unit that prints a content of the read document on an output sheet, wherein
at the time of copying a document having a first size and a document having a second size larger than the first size on output sheets having the same size,
in a first case where a first document has the first size and a second document has the second size, the printing control unit analyzes a first pattern included in the second document, and copies the first and second documents on output sheets having sizes corresponding to the analysis result, and
in a second case where the first document has the second size and the second document has the first size, the printing control unit analyzes a second pattern included in the first document, and copies the first and second documents on output sheets having sizes corresponding to the analysis result.

2. The copying apparatus according to claim 1, wherein
when a position of a pattern included in the document having the second size, which is a position of the first pattern included in the second document in the first case or a position of the second pattern included in the first document in the second case, is analyzed and the pattern falls in the first size,
the printing control unit copies the document having the second size on an output sheet having the first size such that the pattern of the document having the second size falls in the first size by cutting off at least a part of a portion other than the pattern, and
copies the document having the first size on the output sheet having the first size at an equal magnification.

3. The copying apparatus according to claim 2, wherein when the pattern does not fall in the first size,
the printing control unit copies the document having the second size on an output sheet having the second size at the equal magnification, and copies a content of the document having the second size generated by adding a margin to a content of the document having the first size on the output sheet having the second size at an equal magnification.

4. The copying apparatus according to claim 1, wherein on an assumption that the document having the second size is copied on an output sheet having the first size at a reduced magnification, the printing control unit analyzes whether or not a mark included in a pattern in the document having the second size, which is the first pattern included in the second document in the first case or the second pattern included in the first document in the second case, is identifiable by a user on the output sheet having the first size, and when the mark is identifiable by the user, the printing control unit copies the document having the second size on the output sheet having the first size at the reduced magnification, and copies the document having the first size on the output sheet having the first size at an equal magnification.

5. The copying apparatus according to claim 4, wherein when the mark is not identifiable by the user, the printing control unit copies the document having the second size on an output sheet having the second size at an equal magnification, and copies a content of the document having the second size generated by adding a margin to a content of the document having the first size on the output sheet having the second size at an equal magnification.

6. The copying apparatus according to claim 4, wherein the printing control unit determines whether or not the mark is identifiable by the user by using a learned model produced by machine learning based on training data including a combination of a content indicating the document read by the document reading unit and a size of an output sheet on which the document is actually copied.

7. The copying apparatus according to claim 4, wherein the printing control unit obtains a size of the mark by OCR, and determines whether or not the mark is identifiable by the user when the document having the second size is copied on the output sheet having the first size at the reduced magnification by comparing the size of the mark with a threshold.

8. The copying apparatus according to claim 1, wherein a time taken from when reading of the first document is started to when copying of two documents is ended in the first case is longer than in the second case.

9. The copying apparatus according to claim 1, further comprising:

a plurality of sheet feed trays, wherein the printing control unit selects a size of the output sheet from sizes of sheets corresponding to the sheet feed trays.

10. The copying apparatus according to claim 1, wherein when the output sheet having the size corresponding to the analysis result is not feedable, the printing control unit allows a user to select any one of printing after the output sheet having the size corresponding to the analysis result is fed and printing on an output sheet having a size selected according to the analysis result from sizes of feedable output sheets, and performs the printing according to the selection of the user.

11. A method of producing a printout, the method comprising:

at the time of copying a document having a first size and a document having a second size larger than the first size on output sheets having the same size, in a first case where a first document has the first size and a second document has the second size, analyzing a first pattern included in the second document, and copying the first and second documents on output sheets having sizes corresponding to the analysis result; and in a second case where the first document has the second size and the second document has the first size, analyzing a second pattern included in the first document, and copying the first and second documents on output sheets having sizes corresponding to the analysis result.

* * * * *